(12) United States Patent
Burkholder et al.

(10) Patent No.: US 10,412,221 B1
(45) Date of Patent: *Sep. 10, 2019

(54) VERIFICATION PROCESS FOR TEXT-BASED COMMUNICATION CHANNELS

(71) Applicant: Noble Systems Corporation, Atlanta, GA (US)

(72) Inventors: Denney A. Burkholder, Sandy Springs, GA (US); Jason P. Ouimette, Berkeley Lake, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,854

(22) Filed: Feb. 15, 2019

Related U.S. Application Data

(63) Continuation of application No. 15/846,813, filed on Dec. 19, 2017, now Pat. No. 10,270,911.

(51) Int. Cl.
| | |
|---|---|
| *H04M 3/00* | (2006.01) |
| *H04M 3/51* | (2006.01) |
| *G06Q 10/06* | (2012.01) |
| *H04M 3/523* | (2006.01) |

(52) U.S. Cl.
CPC .. *H04M 3/5191* (2013.01); *G06Q 10/063112* (2013.01); *G06Q 10/063114* (2013.01); *H04M 3/5233* (2013.01); *H04M 2203/404* (2013.01)

(58) Field of Classification Search
CPC ............. H04M 3/5191; H04M 3/5183; H04M 3/5232; H04M 3/5233
USPC ................ 379/265.1, 265.09, 265.11–265.12
See application file for complete search history.

(56) References Cited

U.S. PATENT DOCUMENTS 9,712,465 B2 7/2017 Blecon et al.

*Primary Examiner* — Rasha S Al Aubaidi

(57) ABSTRACT

Various embodiments of the invention provide methods, systems, and computer program products for providing near real-time feedback to an originating agent on one or more instances initiated by the originating agent during a text-based communication being conducted between the originating agent and a remote party. In various embodiments, a determination is made that the one or more instances initiated by the originating agent for the text-based communication require verification and as a result, a verification agent is located to review the instances before they are delivered to the remote party. Accordingly, upon the verification agent editing the text of one of the instances, the instance is delivered to the remote party displaying the edited text and the edited text is also displayed to the originating agent at virtually the same time to provide the originating agent with near real-time feedback on the instance.

21 Claims, 22 Drawing Sheets

VERIFICATION PROCESS FOR TEXT-BASED COMMUNICATION CHANNELS

CROSS REFERENCE TO RELATED APPLICATIONS

This application is a continuation of U.S. patent application Ser. No. 15/846,813, filed on Dec. 19, 2017, of which the entire contents are incorporated by reference for all that they teach.

BACKGROUND

Early call centers were structured around handling voice calls that may have been inbound, outbound, or combination of both. While voice calls are a common way of engaging remote parties, modern call centers now handle many other types of communication channels. For instance, many call centers can support various data oriented channels (i.e., non-voice channels) such as email, short messaging service texts (SMS texts), multimedia messaging service texts (MMS texts), social media, fax, and web-based chat. Accordingly, many call centers managing these additional channels have become to be referred to as "contact centers" to reflect that they support many different modes of engaging remote parties, as opposed to only handling voice calls.

In the past, agents who were employed in a call center that only handled voice calls were only required to be able to converse with third parties over telephone calls in a clear, concise, and professional manner to provide a high quality of service to these third parties. However, as the number of channels of communication has increased over the years, agents are now required to possess a number of additional skills to be able to competently handle all the different channels of communication being utilized in a contact center environment. For instance, agents who engage in text-based channels of communication such as SMS text, MMS text, and Web chat with remote parties must also have competent typing, spelling, and grammatical skills. In addition, these agents must be able to convey needed information in written form to third parties that is clear, concise, and in a professional manner. Furthermore, these agents must be able to practice these skills in near real-time due to the nature of many text-based channels of communication and how frequently messages are exchanged between an agent and a remote party. Accordingly, many contact centers engage in training their agents to help them develop these needed skills.

A conventional approach to training agents that has been used in many contact centers is to have training staff (e.g., supervisors) review past communications with agents so that instances that occurred during the communications where improvement can be made are identified and discussed with the agents. For example, a supervisor may review text-based communications that were composed and sent by a particular agent with the agent to help him or her learn how to correctly handle certain information that is to be conveyed in these types of communications as well as how to correctly convey the information grammatically and professionally. However, the problem with using this conventional approach is that coaching is provided to the agents after the communications have been sent. That is to say, the agents are taught how to correct issues that occurred during the communications after the fact. As a result, the remote parties involved in these communications may receive a poor quality of service from the agents involved. In addition, agents may continue to make the same mistakes on multiple communications before they are made aware of the mistakes and are provided feedback on how to correct them.

Another conventional approach to training agents that has been used is to have training staff be involved in the communications as they are taking place between agents and remote parties so that the training staff can provide input to the agents in real-time as the agents interact with the remote parties. For example, a supervisor may serve as a third party and actively view the text messages or Web chat messages exchanged between an agent and a remote party as they take place and provide input to the agent during the exchange. This input may be provided so that the remote party involved in the exchange is also able to see the input as separate messages from the supervisor during the exchange (sometimes referred to as barging in on the communication) or may be provided so that only the agent, and not the remote party, is able to see the input. However, similar to the first approach, this approach again only provides coaching to the agent after the fact. That is to say, this approach only provides input from the supervisor to the agent after a message that triggers the input from the supervisor has been sent by an agent and viewed by the remote party. Accordingly, this approach does not provide the supervisor with an opportunity to edit/correct the message before it is viewed by the remote party. Furthermore, a supervisor's barging in after viewing an errant message to try and remedy the mistake made by the agent may appear intrusive and disruptive to the remote party.

Therefore, a need exists in the art to furnish an approach for providing timely feedback to agents involved in text-based communications with third parties and allows for the correction of messages before they are sent and viewed by a remote party. It is with respect to these considerations and others that the disclosure herein is presented.

SUMMARY

In general, embodiments of the present invention provide computer program products, methods, systems, apparatus, and computing entities for providing near real-time feedback to an originating agent on one or more instances initiated by the originating agent during a text-based communication being conducted between the originating agent and a remote party. For example, the text-based communication may be a Web chat session being conducted between the originating agent and the remote party and the instances requiring verification are chat messages initiated by the originating agent. While in other instances, the text-based communication may be a text messaging session being conducted between the originating agent and a remote party and the instances requiring verification are text messages initiated by the originating agent.

Thus, in various embodiments, a component, such as a communications handler, determines one or more instances initiated by an originating agent for a text-based communication require verification based on some criteria such as, for example, one or more skills of the originating agent and/or a flag set for the text-based communication. As a result, a verification agent is located who is to review the one or more instances initiated by the originating agent before they are delivered to the remote party involved in the text-based communication.

Accordingly, the text of the instances is displayed to the verification agent and upon the agent editing the text of one of the instances, the instance is delivered to the remote party displaying the edited text and the edited text is also displayed to the originating agent at virtually the same time to provide the originating agent with near real-time feedback on the instance. Similarly, upon the verification agent rejecting one of the instances, the instance is prevented from being delivered to the remote party and the instance is displayed to the originating agent as being rejected at virtually the same time to provide the originating agent with near real-time feedback on the instance. In addition, the verification agent may also provide a verification reason identifying a reason he or she edited or rejected an instance and this reason may also be displayed to the originating agent.

In particular embodiments, a timer may be set for the text-based communication for locating a verification agent. In these particular embodiments, if a verification agent cannot be located before the timer expires, then the one or more instances initiated by the originating agent are delivered to the remote party without being verified. Similarly, in particular embodiments, a timer may be set for each of the instances initiated by the originating agent and an instance is delivered to the remote party without being verified if the timer expires before the verification agent has reviewed the instance (e.g., edited or rejected the instance).

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
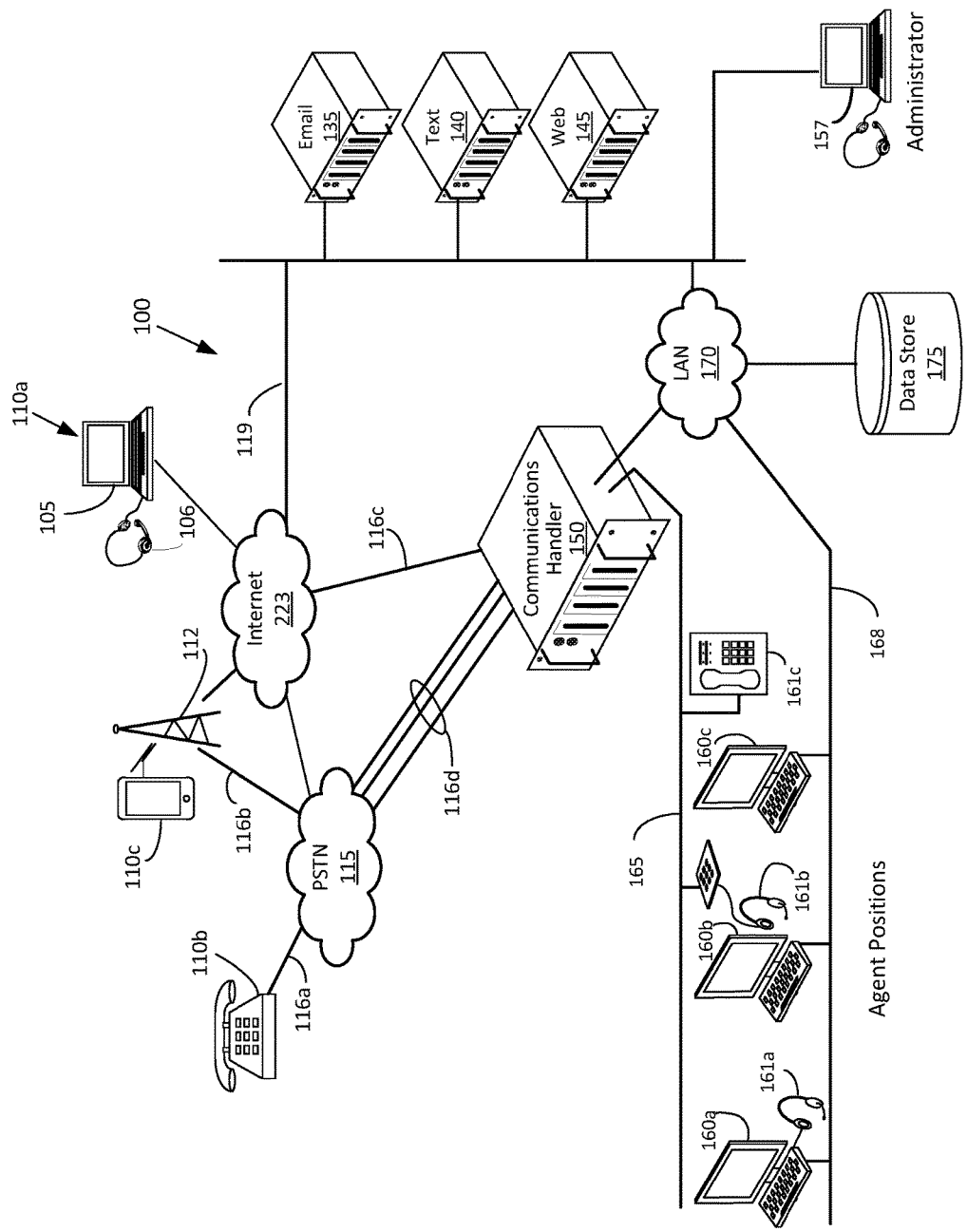
FIG. 1 illustrates a communication architecture used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Text-Based Channels of Communication

As mentioned, agents in call centers have traditionally interacted with customers one at a time using a voice channel. However, many call centers today have evolved into contact centers that allow agents to interact with customers using many different channels of communication. These channels of communication may include voice calls, emails, web-based chats, SMS texts, and MMS texts. Reference to "web-based chat" is also sometimes referred to as "Web chat" or simply "chat" and "SMS text" and "MMS text" is also sometimes simply referred to as "text." Other channels may be involved such as, for example, fax and social media. With that said, several aspects of using these various channels of communication is noted.

Firstly, a voice call is typically intolerant of delay. By "delay," reference is made to the willingness of a party on a call to tolerate delay in receiving a response during a conversational dialogue. Typically, a party conversing with an agent on a call expects the agent to respond in real-time, e.g., within a few seconds. For example, if a party asks an agent a question while conversing, the agent is expected to provide the party with a timely response. While an agent may not always readily know the answer to a question during a call and he or she may need to perform some type of inquiry offline to obtain the answer, the agent is nevertheless expected to inform the party of this situation in a timely manner to set the party's expectation. That is to say, a response of some sort is expected to be provided in real-time in response to a party's verbal question.

Therefore, many call centers make use of training approaches that involve providing agents with feedback after the fact because of this characteristic of a voice call. Since the party involved in a voice call with an agent expects an almost immediate response from the agent while on the call, a call center cannot provide input to the agent, if the agent has made a mistake on the call, until after the agent has made the mistake and the party on the call has heard the mistake. Here, a mistake may be, for example, the agent providing inaccurate information to the party or the agent not handling the call in a professional manner by using inappropriate language or an angry tone with the party.

However, in contrast, non-voice (or "text-based") communications typically do not demand such immediate response by agents. That is to say, a slight delay in an agent responding to a party while involved in a text-based communication is typically tolerable to the party. For instance, a chat communication typically occurs as a result of a party interacting with a website selecting a chat function provided on the site. Here, the party normally interacts with an agent by typing messages on a keyboard connected to some type of computing device such as a personal computer. However, the party involved in the chat communication with the agent does not normally have an expectation that responses from the agent will occur as quickly as responses received during a voice call. That is to say, a party involved in a chat with an agent typically views a delay of a few seconds up to a few minutes occurring before receiving a response to a chat message as acceptable.

Likewise, a party's expectations during a SMS or MMS communication are typically the same. Here, a SMS or MMS communication normally occurs as a result of a party interacting with a hand-held device and selecting the texting capability on the device. The party interacts with an agent by typing text messages on a keyboard provided on the touch screen of the device and the text messages between the party and agent are generally exchanged using rather quick transmission times. Although the party may expect a fairly rapid response to each of his or her text messages, like during a chat, he or she does not typically expect a response quite as rapidly as in a voice call. Instead, a party involved in a SMS or MMS communication with an agent normally views a delay of several seconds up to several minutes occurring before receiving a response to a text message as acceptable, depending on the context of the text message.

Of course, the general expectations of parties involved in communications using the above-discussed channels may be different depending on the circumstances surrounding the communications. However, generally speaking, text-based communications provide contact centers with an environment that allows more opportunity to intervene because of the lower expectation of parties for an immediate response from an agent on such communications. Accordingly, various embodiments of the invention described herein are configured to make use of this opportunity to better train agents and provide an improved quality of service to remote parties.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: Ti trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 150, which could be, for instance, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 150.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, typically provided via a computer monitor. This is used to convey information to the agent about the calls, and the agent may interact with the communications handler 150 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 150 to allow the contact center (including the communications handler 150) to know which agents are available for handling calls. In particular embodiments, the communications handler 150 may also maintain data on an agent's skill level that may be used to route a specific call to the agent or group of agents having the same skill level. The communications handler 150 may also know what types of channels and combinations of channels the agent can handle.

Accordingly, in various embodiments, the communications handler 150 may place a call in a queue if there are no suitable agents available to handle the call, and/or the handler 150 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DTMF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, text messages, emails, and chats. For instance, text messages may be sent by parties using smart phones 110c over a MSP 112 and the Internet 123 and are received by a text gateway server 140. Once received, the text gateway server 140 may inform the communications handler 150 of the text messages and the handler 150 may then queue up the texts for appropriate agents. Similarly, emails may be sent by users over the Internet 123 to an email server 135, and the email server 135 may inform the communications handler 150 of the emails so that the communications handler 150 can queue up the emails for appropriate agents. With respect to chats, in various embodiments a party can request a chat by accessing a website via a Web server 145. In turn, the Web server 145 informs the communications handler 150 of the chat and the handler 150 queues the appropriate agent to handle the chat.

Depending on the embodiment, the interactions between the various components shown may involve using a local area network ("LAN") 170. However, other configurations are possible, such as, but not limited to, using a wide area network, wireless network, router, bridge, direct point-topoint links, etc. Furthermore, in lieu of using facilities 165 directly linked to the communications handler 150 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 150 may be a dialer, such as a predictive dialer, that originates outbound calls at a rate designed to meet various criteria. Here, the communications handler 150 may include functionality for originating calls, and if so, this functionality may be embodied as a private automatic branch exchange ("PBX" or "PABX"). In addition, the communications handler 150 may directly interface with voice trunks using facilities 116c, 116d to the PSTN 115 and/or Internet provider 123 for originating calls. After the calls are originated, the communications handler 150 may perform a transfer operation to connect the calls with agents, a queue, or an IVR. Furthermore, in various embodiments, the communications handler 150 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

As is discussed in greater detail, in various embodiments, the communications handler 150 determines which agent is authorized and available to handle a communication upon being made aware of a voice or non-voice communication, and thereafter appropriately coordinates any response to the communication. In addition, the communications handler 150 may also make use of one or more schemes in allocating communications to agents such as, for example, on a round-robin basis, a least-number-served basis, a first available agent basis, and/or a seniority basis.

Finally, an administrator may configure the different components 135, 140, 145 and communications handler 150 in various embodiments via an administrator workstation 157 to affect how various communications are routed to agents. For instance, in particular embodiments, an administrator has access through the administrator workstation 157 to various data structures for defining what channels of communication and combinations of communication channels agents are able to handle. That is to say, the administrator has access through the administrator workstation 157 to adjust the "mix" of channels of communications and combinations of channels agents are able to handle.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

Exemplary Communication Data Architecture

Figure 2A:
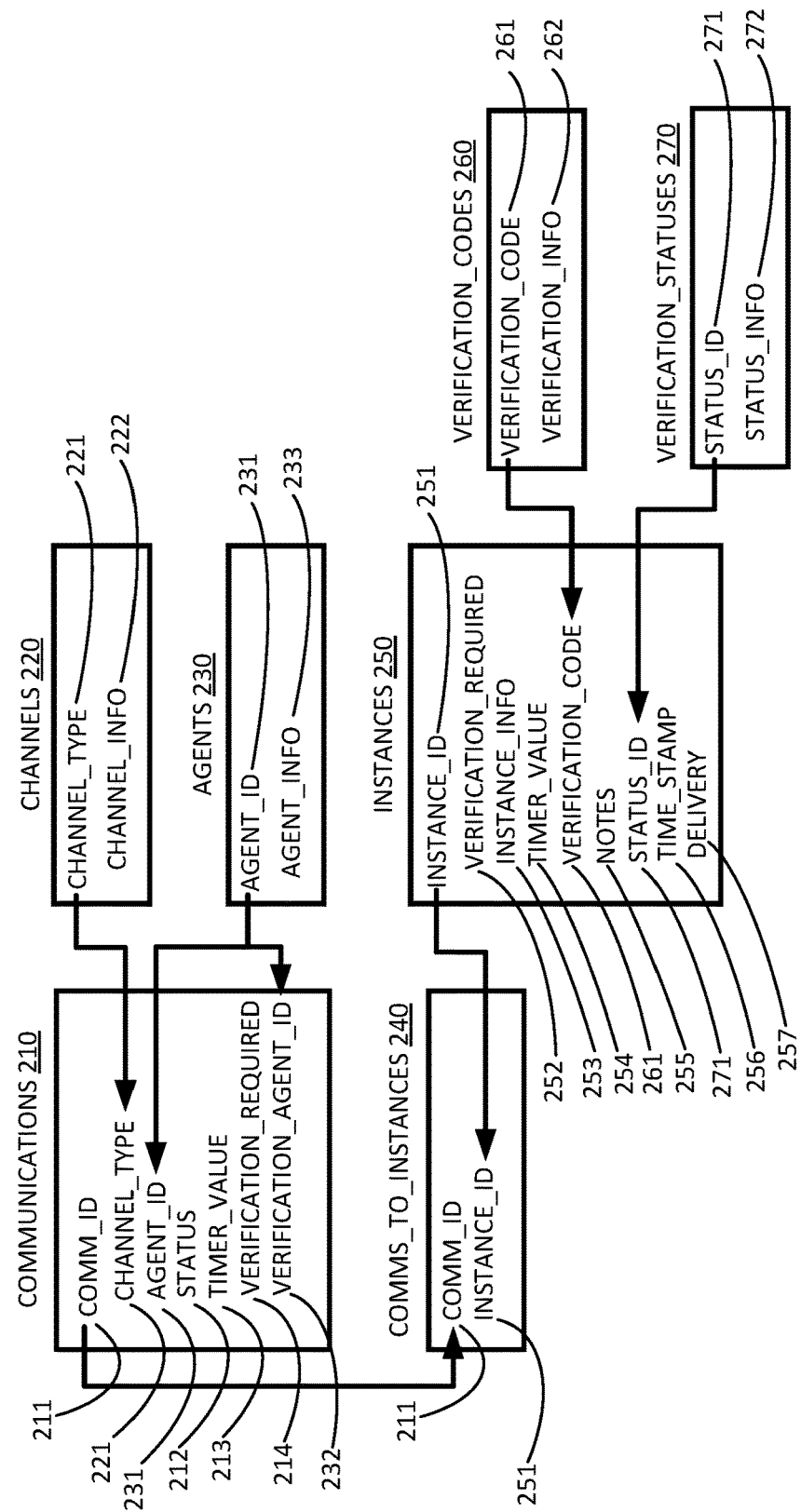
FIG. 2A illustrates a data architecture in accordance with various embodiments of the present invention.

FIG. 2A provides a data architecture for storing information for communications and associating various data elements for the information in accordance with various embodiments of the invention. For instance, this particular architecture may be utilized as a file structure or a database structure in particular embodiments. That is say the primary structures 210, 220, 230, 240, 250, 260, 270 shown in FIG. 2A may be constructed, for example, as individual files or tables depending on whether a file structure or a database structure is used.

Looking at FIG. 2A, the data architecture includes a COMMUNICATIONS structure 210 that stores information on various communications between agents and remote parties. Here, the COMMUNICATIONS structure 210 includes a unique identifier (COMM_ID 211) that is used to identify a particular communication and can be used to retrieve, as well as associate, information stored in other data structures found in the architecture for the communication. For this particular configuration, each communication is associated with a data element (CHANNEL_TYPE 221) identifying the channel of communication being used for the communication. Specifically, this data element (CHANNEL_TYPE 221) identifies the corresponding channel of communication by storing a unique identifier for the channel of communication found in a CHANNELS structure 220.

Thus, the CHANNELS structure 220 stores unique identifiers (CHANNEL_TYPE 221) for each channel of communication that may be utilized by the contact center. For example, the contact center may be utilizing voice calls, text messages, emails, and chats to interact with remote parties. Therefore, in this instance, the CHANNELS structure 220 would include four unique CHANNEL_TYPE identifiers 221, one for each channel of communication being utilized by the contact center. In addition, the CHANNELS structure 220 may also include CHANNEL_INFO 222 that provides general information about the channel such as, for example, the component(s) within the contact center that support the channel. Depending on the embodiment, the CHANNEL_INFO 222 may also be separated out into multiple data elements and/or multiple structures for storage purposes.

In addition, each communication in the COMMUNICATIONS structure 210 is also associated with a data element (AGENT_ID 231) identifying a particular agent who is handling the communication. This agent is considered the originating agent for the communication because the agent originates conveyances (e.g., text messages, chat messages, etc.) to the remote party involved in the communication. Furthermore, each communication in the COMMUNICATIONS structure 210 that involves having the originating agent's conveyances verified is also associated with a data element (VERIFICATION_AGENT_ID 232) identifying a particular agent who is handling the verification for the communication. This agent is considered the verification agent for the communication because the agent reviews and verifies the originating agent's conveyances (e.g., text messages, chat messages, etc.) to the remote party involved in the communication.

Here, both data elements (AGENT_ID 231 and VERIFICATION_AGENT_ID 232) store unique identifiers of agents (AGENT_ID 231) found in an AGENTS structure 230. Accordingly, the AGENTS structure 230 is configured in various embodiments to store information on the agents employed by the contact center to handle communications for the contact center. As mentioned, the AGENTS structure 230 includes an agent identifier (AGENT_ID 231) for each agent that uniquely identifies the agent and can be used to retrieve, as well as associate, information stored in other data structures for the agent. The AGENTS structure 230 may also include AGENT_INFO 233 that provides general information about the agent such as, for example, the agent's name, job title, and pay grade. Depending on the embodiment, the AGENT_INFO 233 may also be separated out into multiple data elements and/or multiple structures for storage purposes.

Continuing on, the configuration of the COMMUNICATIONS structure 210 shown in FIG. 2A also includes a data element (STATUS 212) identifying the status of the communication. Depending on the contact center, a communication may have any number of different statuses. For instance, a communication may have an "active" status. Here, an agent and remote party are actively engaged in the communication such as, for example, when an agent and a remote party are exchanging chat messages during a chat session. In addition, a communication may have a "terminated" status once the communication has been completed such as, for example, when the agent and remote party end the chat session. Furthermore, in other instances, a communication may have other statuses such as, for example, a "hold" status or a "suspended" status for when a communication, such as a telephone call, has been placed on hold by an agent.

In addition, the configuration of the COMMUNICATIONS structure 210 shown in FIG. 2A also includes a data element (TIMER_VALUE 213) that contains a remaining amount of time that is available to locate a verification agent for a communication. As discussed in further detail herein, when a determination is made that the conveyances of a communication sent by an originating agent to a remote party should be reviewed and verified, an agent is identified to serve in the role of reviewing and verifying the originating agent's conveyances. However, in various embodiments, only a predetermined amount of time is allowed to locate a verification agent so that the remote party involved in the communication is not left waiting too long before receiving conveyances from the agent handling the communication. The remainder of this predetermined amount of time is found in the TIMER_VALUE data element 213 of the COMMUNICATIONS structure 210. In particular embodiments, once the value in the TIMER_VALUE data element 213 reaches zero and a verification agent has not been located, the communication is continued without having the originating agent's conveyances reviewed and verified.

In conjunction, the configuration of the COMMUNICATIONS structure 210 shown in FIG. 2A also includes a data element (VERIFICATION_REQUIRED 214) that provides an indication as to whether the originating agent's conveyances are required to be reviewed and verified. For instance, in various embodiments, the VERIFICATION_REQUIRED 214 data element is configured as a Boolean value that contains either true or false. The value true indicates the communication is subject to verification and the value false indicates the communication is not subject to verification. A combination of a TIMER_VALUE equal to zero, a VERIFICATION_REQUIRED equal to true, and a VERIFICATION_AGENT_ID equal to null may indicate that a verification agent could not be located within the predetermined amount of time allocated to find such an agent for a communication.

Continuing on now, in various embodiments, a communication being conducted between an agent and a remote party is made up of one or more associated instances. An instance of a communication refers to a single conveyance by the agent or the remote party during a communication. For example, during a Web chat session between a party and an agent, each chat message sent by the agent and the remote party is considered an instance for the Web chat session (communication).

Accordingly, the data architecture shown in FIG. 2A includes an INSTANCES structure 250 that contains information on various instances that take place during communications. This particular structure 250 includes a unique identifier (INSTANCE_ID 251) that is used to identify a particular instance and can be used to retrieve, as well as associate, information stored in other data structures found in the architecture for the instance. In addition, the structure 250 includes a data element (VERIFICATION_REQUIRED 252) that indicates whether the particular instance is subject to verification or not. Again, in particular embodiments, the VERIFICATION_REQUIRED data element 252 is configured as a Boolean value. As discussed in further detail herein, a determination may be made in particular embodiments on an instance-by-instance basis as to whether any particular instance for a communication is to be reviewed and verified before being delivered to a remote party.

Further, the INSTANCES structure 250 includes information (INSTANCE_INFO 253) on each particular instance. For example, the INSTANCE_INFO 253 for an instance involving a text session may include information such as who originated the instance (the agent or the remote party), the date and time the instance took place for the text session (the date and time the text message was sent for the text session), and/or the actual text of the instance (the text body of the message). Depending on the embodiment, the INSTANCE_INFO 253 may be separated out into multiple data elements and/or multiple structures for storage purposes. In addition, depending on the embodiment, the INSTANCE_INFO 253 may include different information (e.g., different data elements) for different types of communications (e.g., emails versus text messages versus chats).

The INSTANCES structure 250 shown in FIG. 2A also includes a data element (TIMER_VALUE 254) indicating an amount of time remaining for the instance to be reviewed and verified by the verification agent. Thus, similar to the TIMER_VALUE 213 found in the COMMUNICATIONS structure 210, in various embodiments, only a predetermined amount of time is provided to the verification agent to review and verify a particular instance in a communication so that the remote party involved in the communication is not left waiting too long before receiving an instance from the originating agent. The remainder of this predetermined amount of time is found in the TIMER_VALUE data element 254 of the INSTANCES structure 250. In particular embodiments, once the value in the TIMER_VALUE data element 254 reaches zero for a particular instance and the verification agent has not yet reviewed and verified the instance, the instance is sent to the remote party without verification.

The INSTANCES structure 250 shown in FIG. 2A also includes a data element (VERIFICATION_CODE 261) that identifies a reason a verification agent took action with respect to a particular instance. In addition, the INSTANCES structure 250 includes a data element (NOTES 255) that stores any notes entered by the verification agent on the action taken with respect to the particular instance. For example, if the verification agent has to edit a text message being sent by an agent during a text session because of a typographical error, then the verification agent may enter a code that is stored in the VERIFICATION_CODE data element 261 for the text message instance indicating the message was edited due to a typographical error.

For this particular configuration, the VERIFICATION_CODE data element 261 stores a unique identifier (code) that is associated with a VERIFICATION_CODES structure 260. The VERIFICATION_CODES structure 260 stores a unique identifier (VERIFICATION_CODE 261) for each verification reason along with VERIFICATION INFO 262 that provides information on the particular verification reason. Again, the VERIFICATION_INFO 262 may be separated out into multiple data elements and/or multiple structures for storage purposes.

Continuing on, the INSTANCES structure shown in FIG. 2A also includes a data element (STATUS_ID 271) that indicates the status of a particular instance with respect to verification. For example, a particular instance initiated by an agent for a communication may be required to be reviewed and verified before being delivered to a remote party. Here, in particular embodiments, the initial status of the instance may be "pending," indicating the instance is waiting for verification. A verification agent assigned to the communication may review the instance (e.g., review the text message) and edit the instance before having it delivered to the remote party. Accordingly, the status of the instance may be changed from "pending" to "edited."

However, the verification agent may instead reject having the entire instance delivered to the remote party. Here, the status of the instance may be changed from "pending" to "rejected." The verification agent may instead have the instance delivered to the remote party without any changes to it. Here, the status of the instance may be changed from "pending" to "accepted." Had the instance been sent to the remote party without requiring verification or the amount of time allotted for verification expired before the instance was verified, then the status may be changed from "pending" to "no validation required" or "timed out," respectfully. Accordingly, the STATUS_ID data element 271 can inform one what action was taken by a verification agent with respect to a particular instance. For instances received from a remote party, the STATUS_ID data element 271 in particular embodiments may indicate a status of "remote party" to distinguish them from instances originated from an agent to a remote party.

The STATUS_ID data element 271 for the particular configuration of the INSTANCES structure 250 shown in FIG. 2A stores a unique identifier that is associated with a VERIFICATION_STATUSES structure 270. The VERIFICATION_STATUSES structure 270 stores a unique identifier (STATUS_ID 271) for each type of status an instance may have along with STATUS_INFO 272 that provides information on the particular status. Again, the STATUS_INFO 272 may be separated out into multiple data elements and/or multiple structures for storage purposes.

Looking further at the configuration of the INSTANCES structure 250 in FIG. 2A, the structure 250 also includes a data element (TIME_STAMP 256) that indicates the date and time an instance was either originated by an agent handling a communication or received from a remote party involved in the communication. Finally, the structure 250 includes a data element (DELIVERY 257) that indicates whether the instance was delivered to the intended party. For instance, if an instance has been delivered to a remote party, then the DELIVERY 257 data element may have a value of "completed." (Instances received from a remote party may also have a DELIVERY value of "completed.") If an instance is waiting to be reviewed and verified, then the DELIVERY data element 257 may have a value of "pending." Further, if an instance has been rejected by a verification agent, then the DELIVERY data element 257 may have a value of "rejected."

Finally, the data architecture shown in FIG. 2A includes a COMMUNICATIONS_TO_INSTANCES structure 240. This structure 240 links the various instances to specific communications. Thus, the COMMUNICATIONS_TO_INSTANCES structure 240 shown in FIG. 2A includes a combination of a COMM_ID 211 and an INSTANCE_ID 251 that are unique within the structure 240. Therefore, ideally, an instance should only be assigned to one communication and the COMMUNICATIONS_TO_INSTANCES structure 240 is used to identify what instances are related to any particular communication.

Figure 2B:
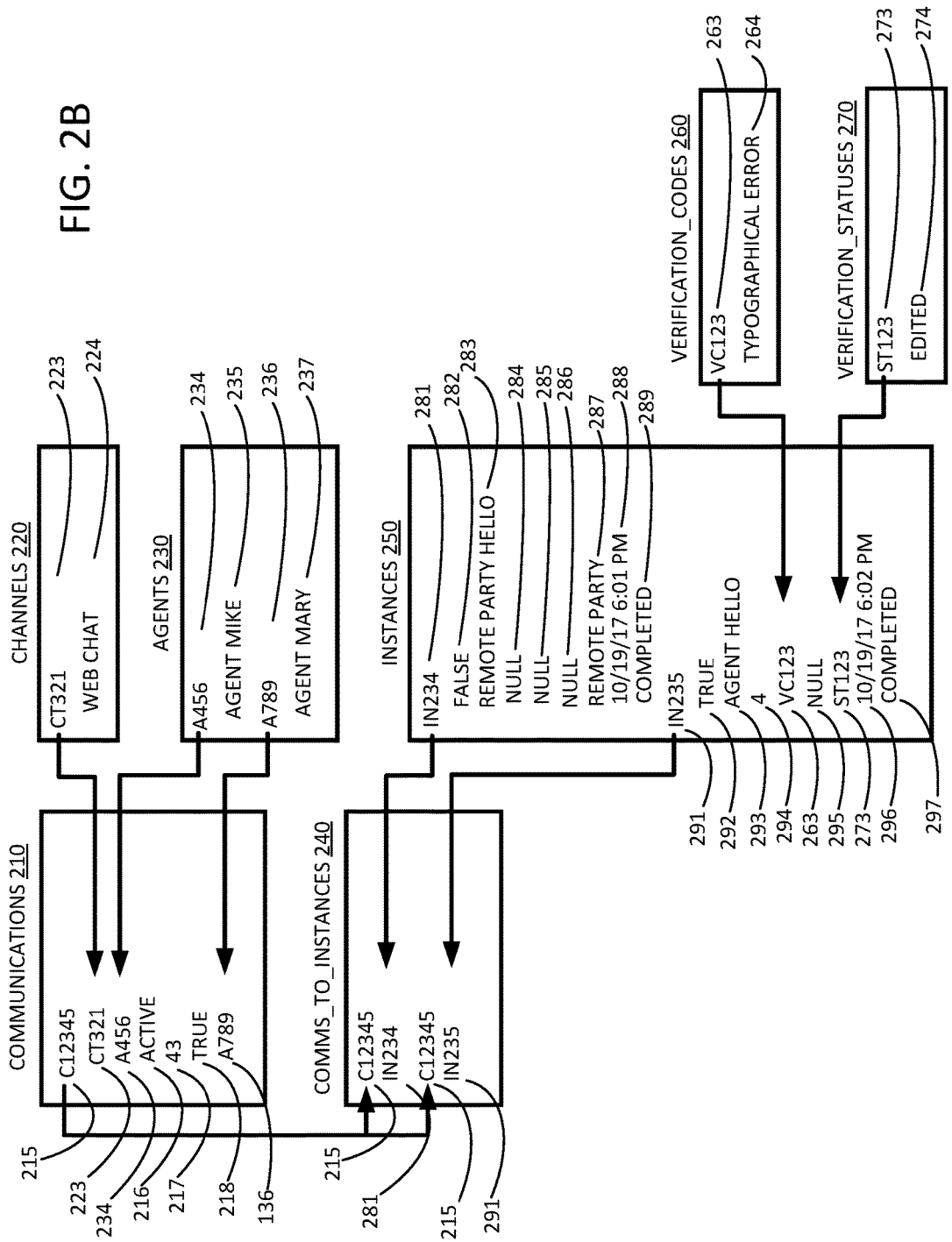
FIG. 2B illustrates an example of data stored in the data architecture shown in FIG. 2A.

Consider an example where a party and an agent are involved in a conversation via a Web chat to discuss a product advertised on a website. FIG. 2B illustrates data stored in the data architecture shown in FIG. 2A for this example. Thus, turning to FIG. 2B, the contact center considers the interaction between the agent and the party to discuss the advertised product to represent a communication. Accordingly, an entry is placed in the COMMUNICATIONS structure 210 for this communication that is associated with the identifier "C12345" 215. Here, the communication entry shows the channel of communication being used for the communication is a Web chat based on the identifier "CT321" 223 that is associated with the same identifier 223 in the CHANNELS structure 220 as a "WEB CHAT" 224.

In addition, the communication entry also shows the communication involves an originating agent associated with the identifier "A456" 234 and a verification agent associated with identifier "A789" 236. Hence, the entry shows the originating agent involved in the communication is "AGENT MIKE" 235 and the verification agent involved in the communication is "AGENT MARY" 237 as identified in the AGENTS structure 230. Further, the status of the communication is "ACTIVE" 216 and verification is required for the communication as indicated by the "TRUE" 218 found in the VERIFICATION_REQUIRED data element 214. Furthermore, forty-three seconds 217 were still remaining when the verification agent was located for the communication as indicated in the TIMER_VALUE data element 213.

Accordingly, two instances are shown to be associated with the communication in the COMMS_TO_INSTANCES structure 240. Here, an entry is found in the structure 240 linking each of the Web chat instance identifiers 281, 291 to the Web chat session identifier 215 to demonstrate the Web chat instances are associated with the Web chat session.

Consequently, the INSTANCES structure 250 includes an entry for the first instance that represents an initial chat message sent by the remote party to initiate the Web chat session. This particular entry is associated with identifier "IN234" 281 and show a status of "REMOTE PARTY" 287. The instance does not require verification since the instance is a chat message sent by the remote party, as shown by the "FALSE" value 282 found in the VERIFICATION_REQUIRED data element 252. Accordingly, the TIMER_VALUE data element 254, the VERIFICATION_CODE data element 261, and the NOTES data element 255 for this instance are all set to "NULL" 284, 285, 286. In addition, the information stored for the instance 283 in the INSTANCE_INFO data element 253 indicates the associated chat message was the remote party initiating the chat session by saying hello. Finally, the instance has been delivered to the originating agent, as shown by the "COMPLETED" 289 found in the DELIVERY data element 257, at 6:01 p.m. on Oct. 19, 2017 288 as shown in the TIME_STAMP data element 256.

The INSTANCES structure 250 also includes an entry for the second instance that represents a second chat message sent by the originating agent at 6:02 p.m. on Oct. 19, 2017 296, to respond to the remote party and announce he or she had joined the chat session as shown in the information for the instance 293. This particular entry is associated with identifier "IN235" 291 and the instance did require verification as indicated by the "TRUE" value 292 found in the VERIFICATION_REQUIRED data element 252. Accordingly, the verification agent reviewed the text of the instance and edited it as indicated by the status identifier "ST123" 273, which is shown in the VERIFICATION_STATUSES structure 270 as "EDITED" 274. At that time the verification agent finished his or her edit of the chat message, there were four seconds remaining to complete the edit of the message 294 as shown in the TIMER_VALUE data element 254. The reason the verification agent edited the text of the instance was because the text contained a typographical error as indicated by the verification code "VC123" 263, which is shown in the VERIFICATION_CODES structure 260 as "TYPOGRAPHICAL ERROR" 264. The verification agent could have included a note to provide further input on his or her edit but did not do so as indicated by the "NULL" 295 found in the NOTES data element 255. Finally, the second instance was delivered to the remote party as indicated by the "COMPLETED" 297 found in the DELIVERY data element 257.

As is common, different agents possess different skill levels with respect to their abilities to handle communications involving various channels of communication and also with respect to their abilities to handle different situations that occur during these communications. Accordingly, in various embodiments, an agent's skill level is considered when determining whether a communication the agent is handling is to be verified and/or whether the agent can serve as a verification agent for a communication. With this in mind, FIG. 3A provides additional structures within the data architecture for managing agents' different abilities to handle communications and/or serve as verification agents.

Figure 3A:
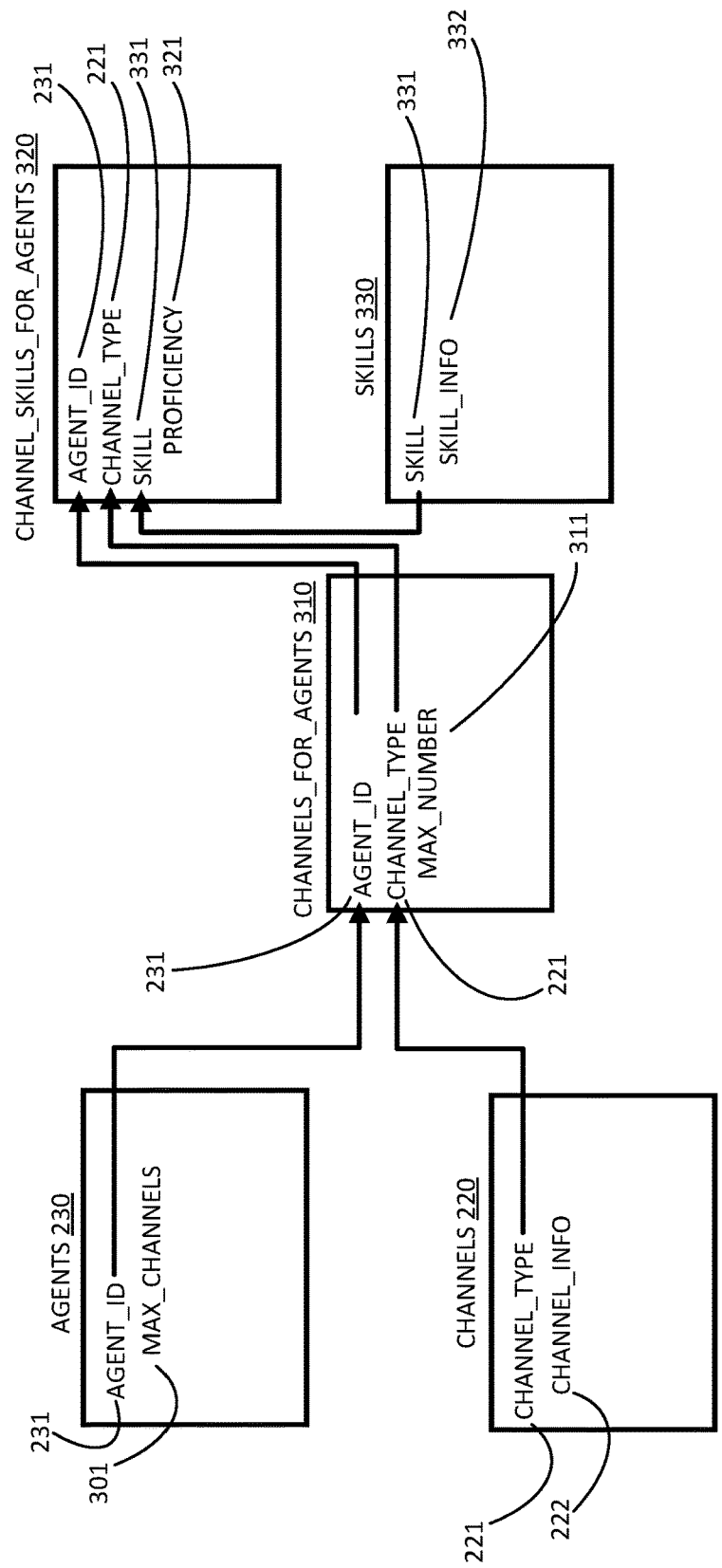
FIG. 3A illustrates a data architecture in accordance with various embodiments of the present invention.

Here, the particular configuration of the data architecture shown in FIG. 3A provides the AGENTS structure 230 also includes along with the data element to store an agent's unique identifier 231, a data element (MAX_CHANNELS) 301 to record an agent's maximum number of communications the agent is authorized to handle at virtually the same time. Depending on the embodiment, the MAX_CHANNELS data element 301 may be independent of the channels of communication that may make up the combination of channels of communication used for the communications.

For instance, an agent's maximum number of communications may be set to four. Therefore, the agent cannot have more than four communications that are actively being handled by the agent at any given time. However, the four sessions may be made up of any combination of channels. For example, the four sessions may include: (1) a voice call session, two text sessions, and a chat session; (2) a voice call session, a chat session, a text session, and an email session; (3) a voice call session, a chat session, and two email sessions; or (4) a voice call session and three chat sessions.

Instead, the data architecture shown in FIG. 3A includes a CHANNELS_FOR_AGENTS structure 310 to control the combination of channels that can make up the sessions an agent is actively handling at any given time. Firstly, the CHANNELS_FOR_AGENTS structure 310 includes a data element (AGENT_ID 231) to store an agent's unique identifier to identify the agent. Secondly, the structure 310 includes a data element (CHANNEL_TYPE 221) to store a channel type. As already discussed, the CHANNEL_TYPE data element 221 is defined in the CHANNELS structure 220 along with information on the channel 222. Finally, the CHANNELS_FOR_AGENTS structure 310 includes a data element (MAX_NUMBER 311) that identifies the maximum number of communications (sessions) the agent is authorized to actively handle at any given time using the associated channel of communication.

For example, an agent may be currently handling four communication sessions. These sessions may include a voice call, two chat sessions, and an email session. The contact center receives an email and looks to see whether the agent is able to handle this email along with the voice call, two chats sessions, and the email session he is already handling. Accordingly, the contact center first looks at the maximum number of communications the agent is authorized to handle at virtually the same time 301 in the AGENTS structure 230. In this example, the data element 301 is set to five. Therefore, the agent is able to handle another session along with the voice call, two chat sessions, and the email session that he is currently handling.

However, the contact center must still look to see whether the agent is authorized to handle the combination of a voice call, two chats sessions, and two emails sessions at virtually the same time. Therefore, the contact centers looks at the maximum number of emails the agent is authorized to handle at virtually the same time in the CHANNELS_FOR_AGENTS structure 310. The contact center queries the structure 310 for this particular channel of communication (CHANNEL_TYPE 221) for the agent (AGENT_ID 231) and finds the maximum number of emails (MAX_NUMBER 312) the agent is authorized to handle at virtually the same time is one. Therefore, the contact center concludes the newly received email cannot be routed to this particular agent.

Moving on, the data architecture shown in FIG. 3A also includes a CHANNEL_SKILLS_FOR_AGENTS structure 320 in various embodiments to define different skill levels an agent has in handling a communication using a particular channel of communication to help control, one, whether the instances initiated by the agent should be verified and, second, whether the agent can serve as a verification agent for a particular communication. Again, the CHANNEL_SKILLS_FOR_AGENTS structure 320 includes a data element (AGENT_ID 231) to store an agent's unique identifier to identify the agent and a data element (CHANNEL_TYPE 221) to store a channel type. However, in addition, the CHANNEL_SKILLS_FOR_AGENTS structure 320 includes a SKILL data element 331 identifying a skill an agent possesses in handling a communication session for a particular channel of communication. The specific skills that can be assigned to an agent are managed in the SKILLS structure 330 as shown in FIG. 3A. The SKILLS structure 330 includes a unique identifier (SKILL 331) for a skill and a data element storing information on the skill (SKILL_INFO 332). Accordingly, in particular embodiments, the communications handler 250 may associate each communication with any required skills an agent must have for his or her instances not to require verification and/or for the agent to serve as a verification agent for a communication session.

Finally, the CHANNEL_SKILLS_FOR_AGENTS structure 320 in particular embodiments may include a data element (PROFICIENCY 321) for a proficiency level associated with each skill indicating an agent's proficiency level for the corresponding skill. For example, an agent may have the skill "printer help" set for chat sessions indicating the agent is able to handle chat sessions involving providing technical help for printer issues. However, not all agents who are assigned this skill may necessarily have the same proficiency level in providing technical help for printer issues. Therefore, the communications handler 250 may determine a chat session requires an agent to provide verification who has the skill "printer help" with a minimum proficiency level of seven (out of ten, with ten being the highest proficiency level), and this information can be used to determine which agents to consider in identifying an verification agent for the chat session.

Figure 3B:
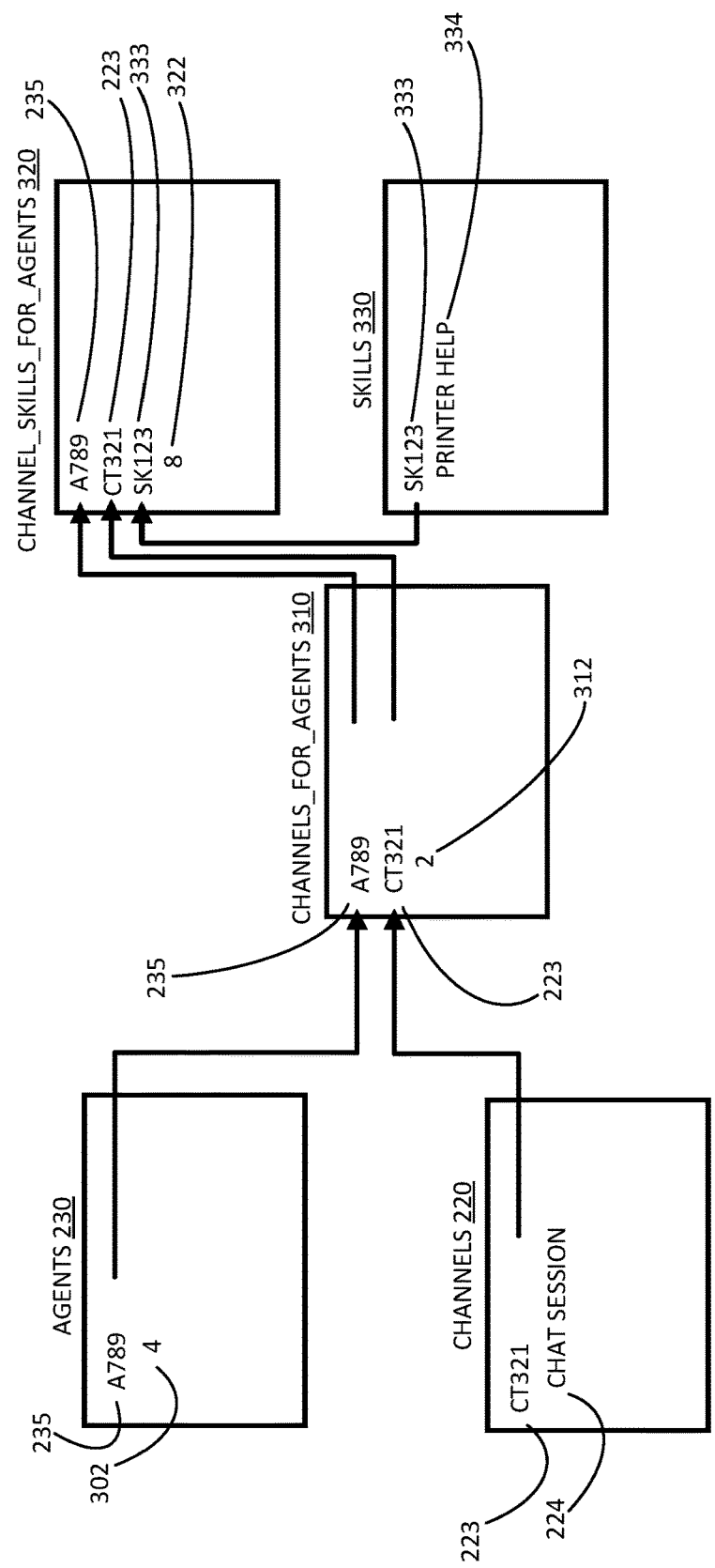
FIG. 3B illustrates an example of data stored in the data architecture shown in FIG. 3A.

Turning now to FIG. 3B, this figure illustrates data stored in the data architecture shown in FIG. 3A. Here, the AGENTS structure 230 includes an entry for Agent Mary (AGENT_ID="A789" 235) and shows that she has a maximum number of four sessions 302 allowed at any given time. Accordingly, the CHANNELS_FOR_AGENTS structure 310 shows Agent Mary can have a maximum number of two 312 chat sessions (CHANNEL_TYPE="CT321" 223) at any given time.

Therefore, if a remote party initiates a chat session with the contact center that is assigned to an agent and the contact center determines the chat messages from the agent should be reviewed and verified, then the contact center must identify a verification agent for the chat session. Accordingly, the contact center considers Agent Mary, who is currently serving as a verification agent on another chat session. Here, looking at the AGENTS structure 230, the maximum number of communications Agent Mary 235 is authorized to handle at any given time is four 302. Therefore, the contact center determines Agent Mary has the capacity to serve as the verification agent on the chat session. However, the contact center also needs to determine whether Agent Mary is allowed to serve as a verification agent for two chat sessions at the same time. Therefore, the contact center concludes from the CHANNELS_FOR_AGENTS structure 310 that Agent Mary can indeed serve as the verification agent for the two chat sessions because the maximum number of sessions Mary 235 is authorized to handle for chat 223 is two 312.

Lastly, the contact center needs to ensure that Agent Mary has the required skill and proficiency to serve as the verification agent for the chat session. The subject matter of the chat session involves providing technical help to a remote party with regard to a printer problem and requires a proficiency with respect to this skill of six. Here, the CHANNEL_SKILLS_FOR_AGENTS and SKILLS structures 320, 330 indicate Agent Mary (AGENT_ID="A789" 235) has the skill (SKILL="SK123" 333 and SKILL_INFO="PRINTER HELP" 334) for the chat channel (CHANNEL_TYPE="CT321" 223) with a proficiency level of eight (PROFICIENCY="8" 322). Therefore, Agent Mary has the required skill and proficiency to serve as the verification agent for the chat session. Accordingly, the contact center assigns Agent Mary to serve as the verification agent for the chat session.

Thus, the data architecture shown in FIGS. 2A-3B demonstrates how a communication representing an interaction conducted between an agent and a party for a particular purpose is associated ("linked") to its corresponding instances and how these instances are linked to corresponding verification information. In addition, the data architecture shown in these figures demonstrates how a contact center can go about identifying an agent with the right skills and proficiency level for the skills to serve as a verification agent on a communication.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Handle Communication Module

Figure 4:
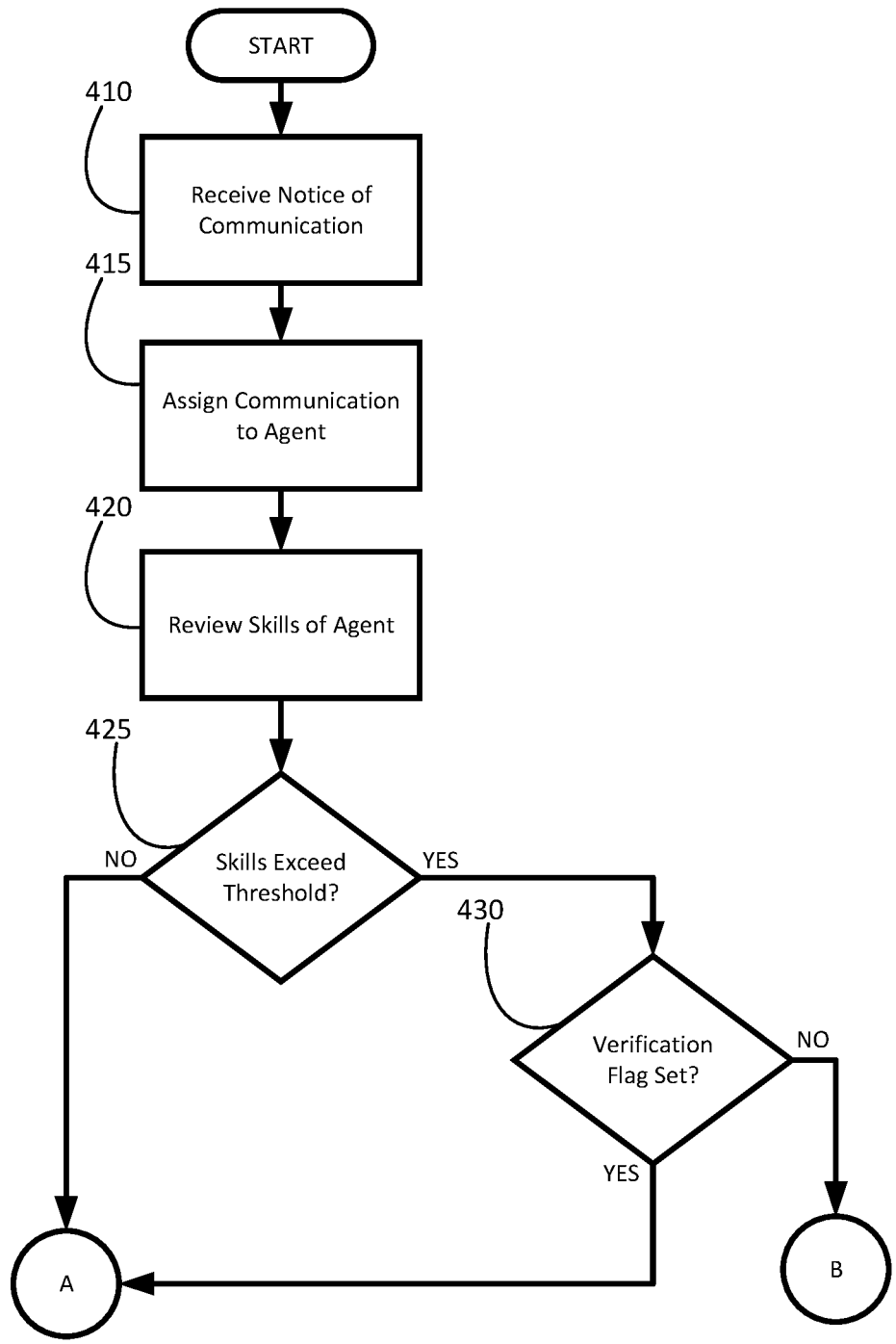
FIG. 4 illustrates a process flow for handling a text-based communication in accordance with various embodiments of the present invention.

Turning now to FIG. 4, additional details are provided regarding a process flow for handling a text-based communication according to various embodiments of the invention. In particular, FIG. 4 is a flow diagram showing a handle communication module for performing such functionality according to various embodiments of the invention. For example, the flow diagram shown in FIG. 4 may correspond to operations carried out by one or more processors in one or more components, such as, for example, the communications handler 150 described above, as it executes the handle communication module stored in the component's volatile and/or nonvolatile memory.

The process flow begins with the handle communication module receiving a notification of a text-based communication in Operation 410. Accordingly, the communication may involve using any one of a number of different channels of communication such as, for example, a chat message or a text message. For instance, the communication may be a chat session initiated by a remote party on a website being supported by a Web server 145 within the contact center and the Web server 145 may have informed the communications handler 150 of the chat session, resulting in the handle communication module receiving a notification of the session.

Next, the handle communication module assigns an agent to the communication in Operation 415. Here, depending on the embodiment, the handle communication module may use various criteria in selecting an agent to handle the communication. For example, if the remote party has initiated the Web chat session to inquire about the possible purchase of a product being sold through the website, then the handle communication module may identify an agent with sales knowledge on the products advertised on the website to assign to the chat session. Other skills-based routing criteria may be considered by the contact center as those of ordinary skill in the art can envision in light of this disclosure.

Continuing on, the handle communication module may be configured in various embodiments to incorporate one or more mechanisms (settings) that are used in determining whether the conveyances (instances) originated by the agent and delivered to a remote party (e.g., the chat messages entered by the agent and sent to the remote party during the chat session) should be reviewed (verified) by a verification agent prior to being delivered to the remote party. Accordingly, the handle communication module shown in FIG. 4 is configured with two such mechanisms.

The first of these mechanisms is a determination is made based on the skill level of the agent engaged in the communication with the remote party as to whether the agent's instances should be reviewed and verified prior to being delivered to the remote party. If the originating agent's skill level is at an acceptable level, then the contact center considers the agent is competent enough to initiate instances during the communication without having the instances reviewed by a verification agent. Therefore, the handle communication module reviews the originating agent's skill level in Operation 420. Accordingly, in various embodiments, the particular skills that are reviewed by the handle communication module can vary depending on the type of communication being conducted with the remote party. For example, the communication may pertain to providing the remote party with technical support for a problem the party is having with a purchased product. Here, the handle communication module may review the level of technical training the originating agent has received in making a determination as to whether the instances initiated by the agent during the communication should be reviewed before being sent to the remote party.

Thus, the handle communication module determines whether the required skills of the originating agent exceed a threshold in Operation 425. If so, then the handle communication module determines the agent's instances do not need to be reviewed and verified before being delivered to the remote party for this particular mechanism. However, if the originating agent's skill level does not exceed the threshold, then the agent's instances are to be reviewed and verified before being delivered to the remote party.

The second mechanism for determining whether the instances initiated by the originating agent need to be verified is the handle communication module determines whether a verification flag has been set for the communication in Operation 430. In particular instances, the contact center may decide the originating agent's instances for a communication should be reviewed before being delivered regardless of the agent's skill level. For instance, the contact center may set a policy that every text-based message sent in reply to a complaint received from a remote party should be reviewed and verified before being sent to the remote party to ensure the message addresses the complaint adequately. While in another instance, the contact center may set a policy that every text-based message that is sent in reply to processing a money return must first be reviewed before being sent to ensure the return is valid and processed correctly. Here, the contact center is setting a flag to have such communications reviewed, not so much to ensure the content of the agent's instances is acceptable, but to ensure the context of the instances is acceptable (to ensure the return is valid) before being delivered to the remote parties.

Figure 5:
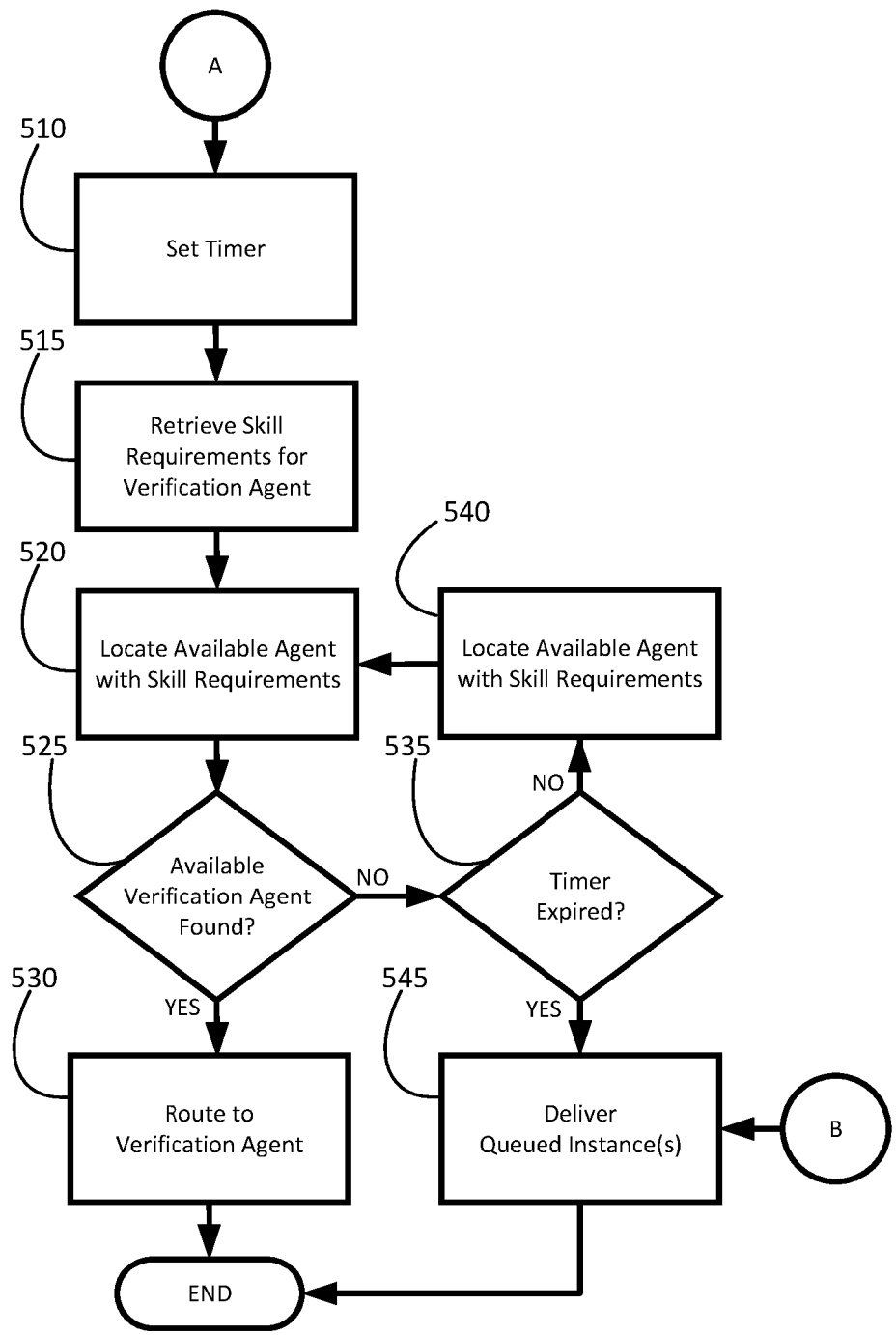
FIG. 5 illustrates a process flow for identifying a verification agent in accordance with various embodiments of the present invention.

Turning now to FIG. 5, a continuation of the process flow for the handle communication module is provided after a determination has been made as to whether the agent's instances for a communication should be verified before being delivered to a remote party. Here, the process continues at B when a determination has been made by the handle communication module that the agent's instances do not need to be verified before being delivered. Accordingly, the handle communication module delivers any queued instances that may have already been initiated by the agent assigned to the communication to the remote party in Operation 540.

However, if the handle communication module has instead determined the agent's instances do need to be reviewed and verified before being delivered to the remote party, then the process continues at A with the handle communication module setting a timer in Operation 510. The timer is used in various embodiments to ensure that the remote party does not wait too long before receiving any response from the agent assigned to the communication. In particular embodiments, the timer may be set based on specific characteristics of the communication. For example, the timer may be set for a longer amount of time if the communication involves a text session as opposed to a chat session. This may be because a remote party may be more tolerable with receiving a delayed response from the agent if the communication involves text over chat since chat is carried out in a more conversational context than text messaging.

In addition, the timer may be set for a longer amount of time if the communication is being initiated by an agent as opposed to a communication initiated by a remote party. For instance, if the communication involves an initial text message sent by an agent to a remote party than the amount of delay before the message is sent to the remote party is immaterial since the remote party has not yet been contacted and therefore is not likely expecting to receive a text message from the contact center. However, if the text message is in response to a previous text message received from a remote party, then the timer may be set to a shorter amount of time because the remote party may be waiting to receive a response text message back from the contact center. Thus, depending on the embodiment, the handle communication module may be configured to look at one or more parameters associated with the communication to determine what amount of time to set for the timer. Those of ordinary skill in the art can envision other parameters the handle communication module may use in setting the timer in light of this disclosure.

Continuing on, the handle communication module next retrieves the skills required of an agent who can review and verify the originating agent's instances for the communication (a verification agent) in Operation 515. Again, depending on the circumstances, the skills required by the verification agent may be contingent on the context and content of the communication that is to be reviewed. Accordingly, the handle communication module in various embodiments may be configured to look at parameters associated with the communication to identify and retrieve the skill requirements needed by a verification agent to review and verify the originating agent's instances for the communication. The same can be true with respect to the originating agent assigned to the communication. The skill requirements needed by a verification agent may be contingent on the skills possessed by the originating agent.

Once the handle communication module has retrieved the skill requirements for a verification agent, the handle communication module attempts to locate an available agent who has the required skills to serve as the verification agent in Operation 520. Depending on the circumstances, the contact center may have identified a particular group of agents that may serve as verification agents so that the handle communication module is configured to consider this group of agents when attempting to locate an available agent to serve as the verification agent for the communication. Accordingly, the handle communication module may determine whether a particular agent has the capacity to serve as the verification agent for the communication. For example, an agent in the verification group may be currently serving as a verification agent on another communication and may be expected to become available within the next couple of minutes. Therefore, the module may identify this agent as available to serve as the verification agent for the communication.

Again, depending on the embodiment, the handle communication module may be configured to use different criteria for identifying an available agent to serve as the verification agent for the communication. For instance, if the communication involves an initial text message being sent to a remote party, then the handle communication module may be configured to identify an agent with the required skills who is expected to be able to review the initial text message within the next ten minutes. However, if the communication involves a chat session being conducted between an agent and a remote party, then the handle communication module may be configured to identify an agent who is currently not handling any other communications for the contact center so that the agent's instances for the chat session can be reviewed quickly.

Accordingly, the handle communication module determines whether a verification agent has been identified in Operation 525. If so, then the communication is routed to the identified agent in Operation 530. As is further detailed herein, the identified verification agent is made aware of the communication he or she is to review and verify. Depending on the embodiment, the verification agent may review and verify the originating agent's individual instances for the communication by approving the instance as-is, editing the instance first before having it delivered to the remote party, and/or rejecting the instance completely and not having it delivered to the remote party. In addition, the originating agent may be made aware of the verification agent's actions with respect to individual instances.

Returning to Operation 525, if the handle communication module did not locate an available agent, then the handle communication module determines whether the timer for the communication has expired in Operation 535. As previously mentioned, the timer is set to ensure the remote party receives a response from an agent within an appropriate amount of time without having to wait too long and possibly becoming frustrated. Therefore, if the timer has not expired, then the handle communication module decrements the timer in Operation 540 and returns to Operation 520 to attempt to locate a verification agent for the communication. However, if the timer has expired, then the handle communication module delivers the queued instances of the agent involved in the communication to the remote party without having the instances reviewed and verified in Operation 545. However, in some circumstances, the handle communication module may be configured to overlook the timer and not deliver the instances regardless of how long the instances have been on hold waiting to be reviewed.

Handle Instance Module

Figure 6:
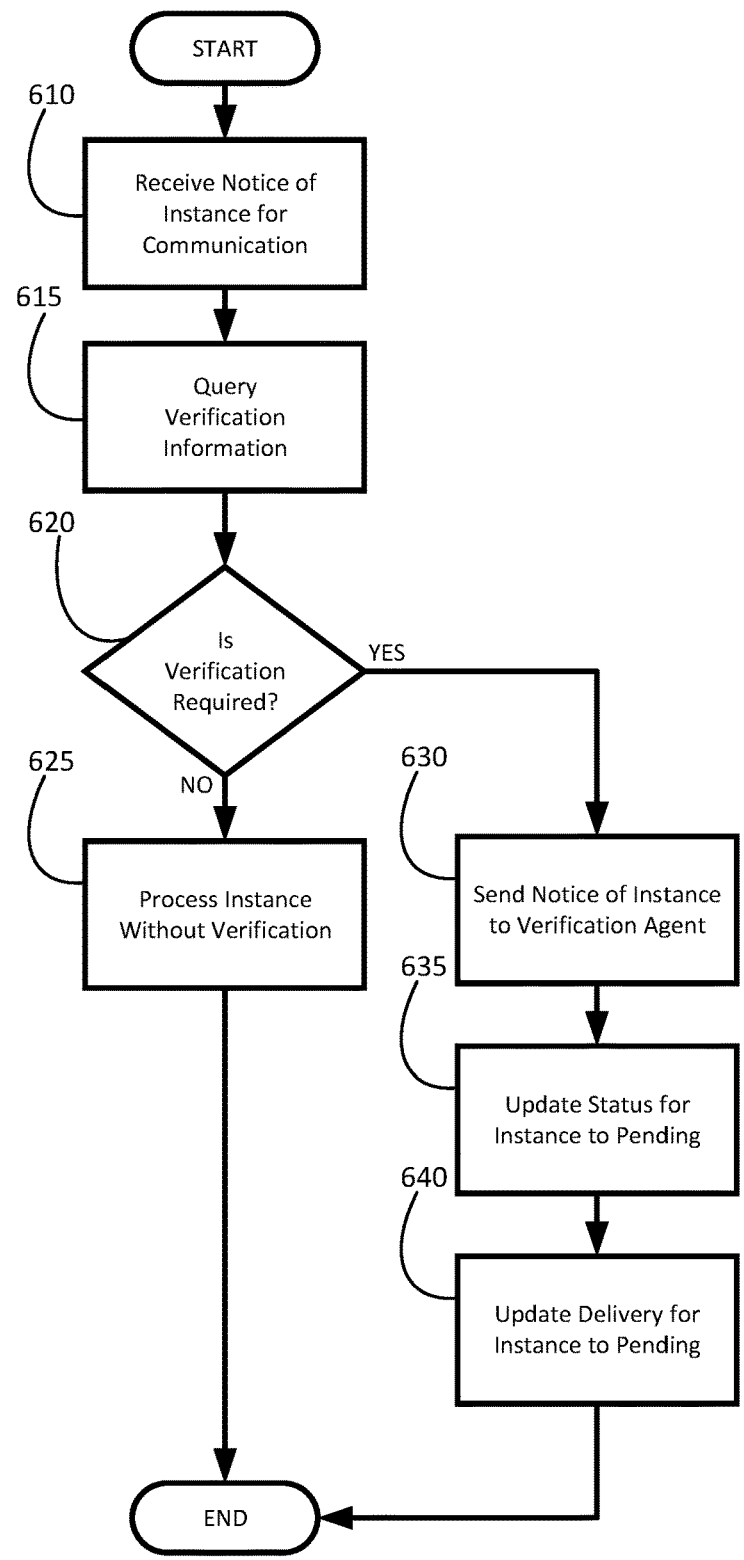
FIG. 6 illustrates a process flow for routing an instance of a communication to a verification agent in accordance with various embodiments of the present invention.

Turning now to FIG. 6, additional details are provided regarding a process flow for handling an instance for a text-based communication according to various embodiments of the invention. In particular, FIG. 6 is a flow diagram showing a handle instance module for performing such functionality according to various embodiments of the invention. For example, the flow diagram shown in FIG. 6 may correspond to operations carried out by one or more processors in one or more components, such as, for example, the communications handler 150 described above, as it executes the handle instance module stored in the component's volatile and/or nonvolatile memory.

As the reader may recall, an instance of a communication refers to a single conveyance by the agent or the remote party during the communication. For example, a text message sent by an agent to a remote party during a text session. Accordingly, the process flow begins with the handle instance module receiving a notification of an instance for a communication in Operation 610. In various embodiments, the notification includes some type of identifier of the communication and/or the instance that the handle instance module can then use to retrieve information on the instance.

Therefore, in Operation 615, the handle instance module queries verification information for the communication and/or the instance. Here, depending on the embodiment, the handle instance module may be configured to query various information that can be used in determining whether the instance is required to be verified before being sent. For instance, in particular embodiments, the handle instance module may query information on the communication (e.g., the VERIFICATION_REQUIRED data element 214 in the COMMUNICATIONS structure 210) to determine whether the communication is identified as one in which verification is required for instances initiated by the agent handling the communication. While in other embodiments, the handle instance module may query information on the particular instance (e.g., the VERIFICATION_REQUIRED data element 252 in the INSTANCES structure 250) to determine whether the communication is identified as one in which verification is required for the instance. While still in other embodiments, the handle instance module may query information on both the communication and the particular instance.

Accordingly, once the handle instance module has queried the verification information, the module determines whether the instance is required to be verified in Operation 620. If not, then the handle instance module has the instance processed without verification in Operation 625. Typically, such processing involves delivering the instance to the intended party (e.g., the agent or the remote party) without having to involve a verification agent.

However, if the handle instance module determines the instance does require verification, then the module sends the verification agent notice of the instance in Operation 630. For instance, in particular embodiments, the handle instance module sends some type of notification that appears on the verification agent's workstation informing the agent of the instance that needs to be reviewed and verified. In addition, in particular embodiments, the handle instance module updates the status and delivery of the instance (e.g., the STATUS_ID data element 271 and the DELIVERY data element 257 in the INSTANCES structure 250) to "pending" in operations 635 and 640. At this point, the instance is queued up and pending review by the verification agent.

Display Instance Module

Figure 7:
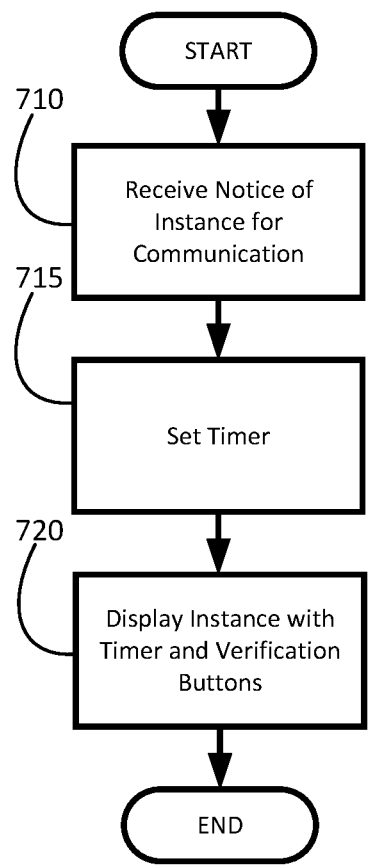
FIG. 7 illustrates a process flow for a verification agent receiving an instance of a communication in accordance with various embodiments of the present invention.

Turning now to FIG. 7, additional details are provided regarding a process flow for displaying an instance for a text-based communication on a verification agent's workstation according to various embodiments of the invention. In particular, FIG. 7 is a flow diagram showing a display instance module for performing such functionality according to various embodiments of the invention. For example, the flow diagram shown in FIG. 7 may correspond to operations carried out by one or more processors in one or more components, such as, for example, a verification agent's workstation described above, as it executes the display instance module stored in the component's volatile and/or nonvolatile memory.

Here, in various embodiments, the display instance module receives some type of notification of the instance for the communication in Operation 710. For example, in particular embodiments, the display instance module receives a notice from the handle instance module described herein that identifies the instance and the communication associated with the instance. In addition, the notice may include the text of the instance so that the text can be displayed on the verification agent's workstation for review.

Accordingly, in Operation 715, the display instance module sets a timer for the instance. This particular timer sets a limit on the amount of time the verification agent has to review the instance and make a decision as to whether to deliver the instance to the remote party as-is, edit the instance before delivering it to the remote party, or reject the instance so that it is not delivered to the remote party. In various embodiments, if the verification agent fails to review the instance before the timer expires then the instance is delivered to the remote party without verification. Therefore, in these particular embodiments, the timer ensures that the remote party is receiving responses from the agent handling the communication in a timely fashion. As previously noted, in particular embodiments, the display instance module may be configured not to set a timer for particular instances because the contact center wants to ensure such instances are reviewed and verified before being delivered to a remote party, regardless of the amount of time required by the verification agent to review the instances.

Finally, the display instance module displays the instance with the timer and one or more verification buttons in Operation 720. Once the instance has been displayed on the verification agent's workstation, the agent can then review the text of the instance (e.g., review the text of the text message or chat message), edit the text is desired, and/or approve or reject the instance if desired. Accordingly, in particular embodiments, the actions taken by the verification agent with respect to the instance are communicated to the originating agent handling the communication at virtually the same time the instance is delivered to the remote party or rejected so that the originating agent is made aware of such actions and can learn in near real-time on how the instance should have been crafted and of any errors the originating agent may have made in the instance. Here, the phrase "virtually at the same time" generally means the actions taken by the verification agent are communicated to the originating agent while the originating agent and the remote party are still engaged in the communication. Ideally, the actions should be communicated to the originating agent within a few seconds (e.g., within ten seconds) of the instance being delivered or rejected.

Figure 8:
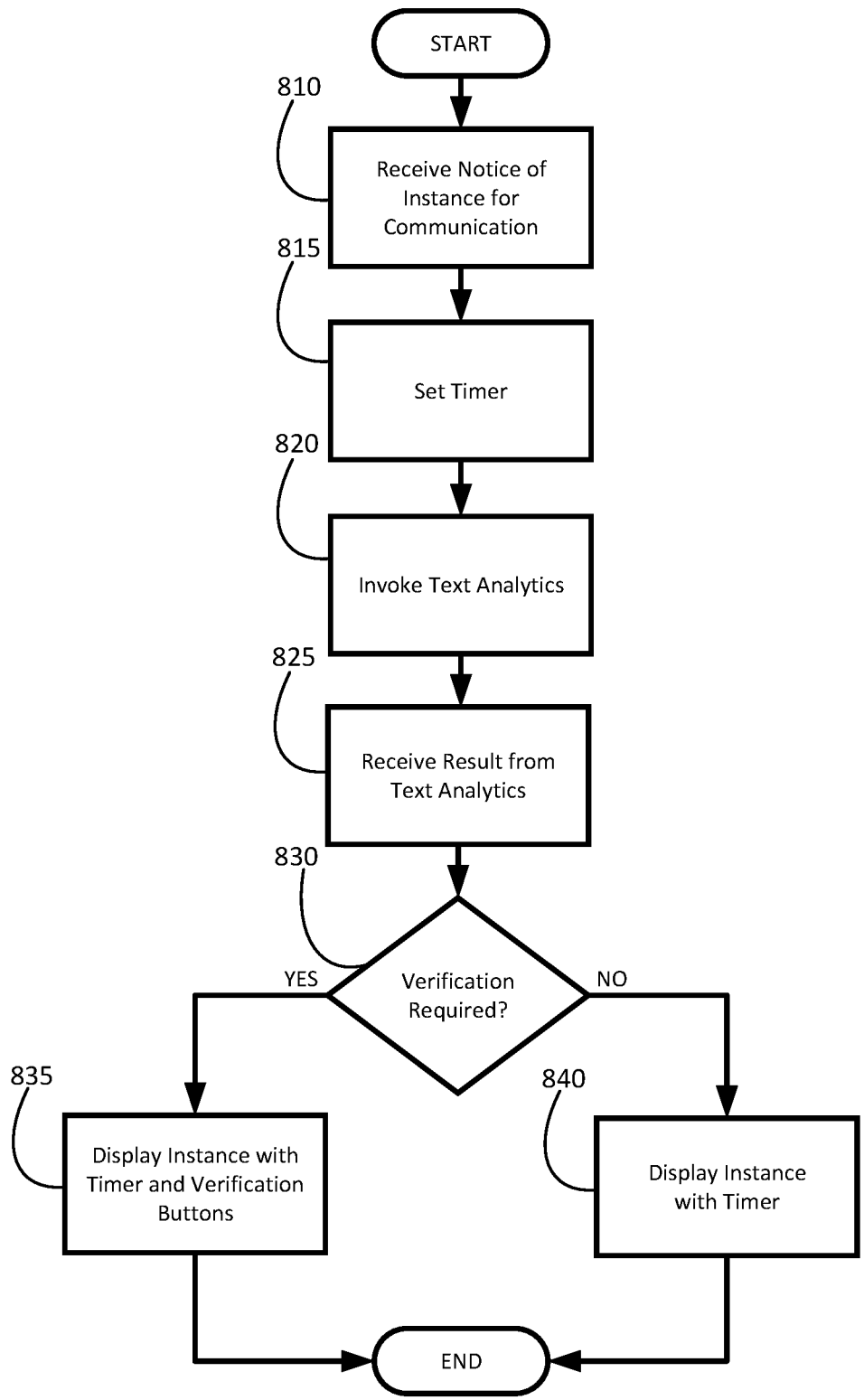
FIG. 8 illustrates a process flow for determining whether an instance of a communication needs to be verified in accordance with various embodiments of the present invention.

Turning now to FIG. 8, a process flow for another embodiment of the display instance module is provided. Here, the process flow involves the display instance module having some type of analytics performed on the text of an instance to determine whether the instance needs verification or not. Accordingly, this embodiment of the display instance module may allow for a communication to be identified as requiring verification, but then make a determination based on individual instances whether a particular instance needs verification or not. Such a configuration may allow some instances that are viewed as "routine" to avoid being held up for verification and to lessen the amount of review the verification agent has to perform for the communication.

Again, the display instance module receives a notice of an instance for a communication in Operation 810 and sets a timer for instance in Operation 815. Next, the display instance module determines whether the content of the message may require the message to be reviewed and verified before sending to the remote party. Accordingly, the display instance module invokes text analytics to be carried out on the instance in Operation 820. Here, the text analytics is performed to identify any words in the instance that may indicate the instance should be reviewed before being delivered to the remote party. For instance, the text analytics may entail reviewing the instance to determine whether it contains one or more keywords (or combination of keywords—a keyphrase) that indicate the instance should be reviewed before being sent to the remote party.

For example, curse words may be identified as keywords that when present in an instance, the instance should be reviewed (and likely edited) before being delivered to the remote party. In other instances, words may be identified as keywords based on the context of the instance being delivered. For example, if the instance is a reply for a purchase made by a remote party, then any words or numbers that may represent sensitive information such as a credit card number or a bank account number can be defined as keywords that when present, the instance should be reviewed before being delivered to the remote party.

Accordingly, the display instance module receives the result for the text analytics in Operation 825 and determines whether verification is required for the instance based on the result in Operation 830. In other words, in various embodiments, the display instance module determines whether any keywords were identified in the text of the instance. If so, then the instance is displayed on the verification agent's workstation with an indication that it should be reviewed and verified. For example, in particular embodiments, the display instance module has the instance displayed on the verification agent's workstation along with the timer and verification buttons in Operation 835. On the other hand, if the display instance module determines the instance does not need to be verified, then the module may display the instance on the verification agent's workstation with only the timer and without verification buttons in Operation 840. Thus, this embodiment of the display instance module allows for verification process to be carried out on an instance-by-instance basis.

Edit Instance Module

Once a verification agent has been given notice of an instance that needs verification for a communication, the agent typically has a set amount of time to review and verify the instance. Accordingly, in various embodiments, the instances that need verification are displayed on the verification agent's workstation and the agent selects a particular instance to take one or more actions with respect to the instance. Specifically, the verification agent may (1) accept the text of the instance as-is and have the instance delivered to the remote party, (2) edit the text of the instance before having the instance delivered to the remote party, or (2) completely reject the instance so that it is not delivered to the remote party.

Figure 9:
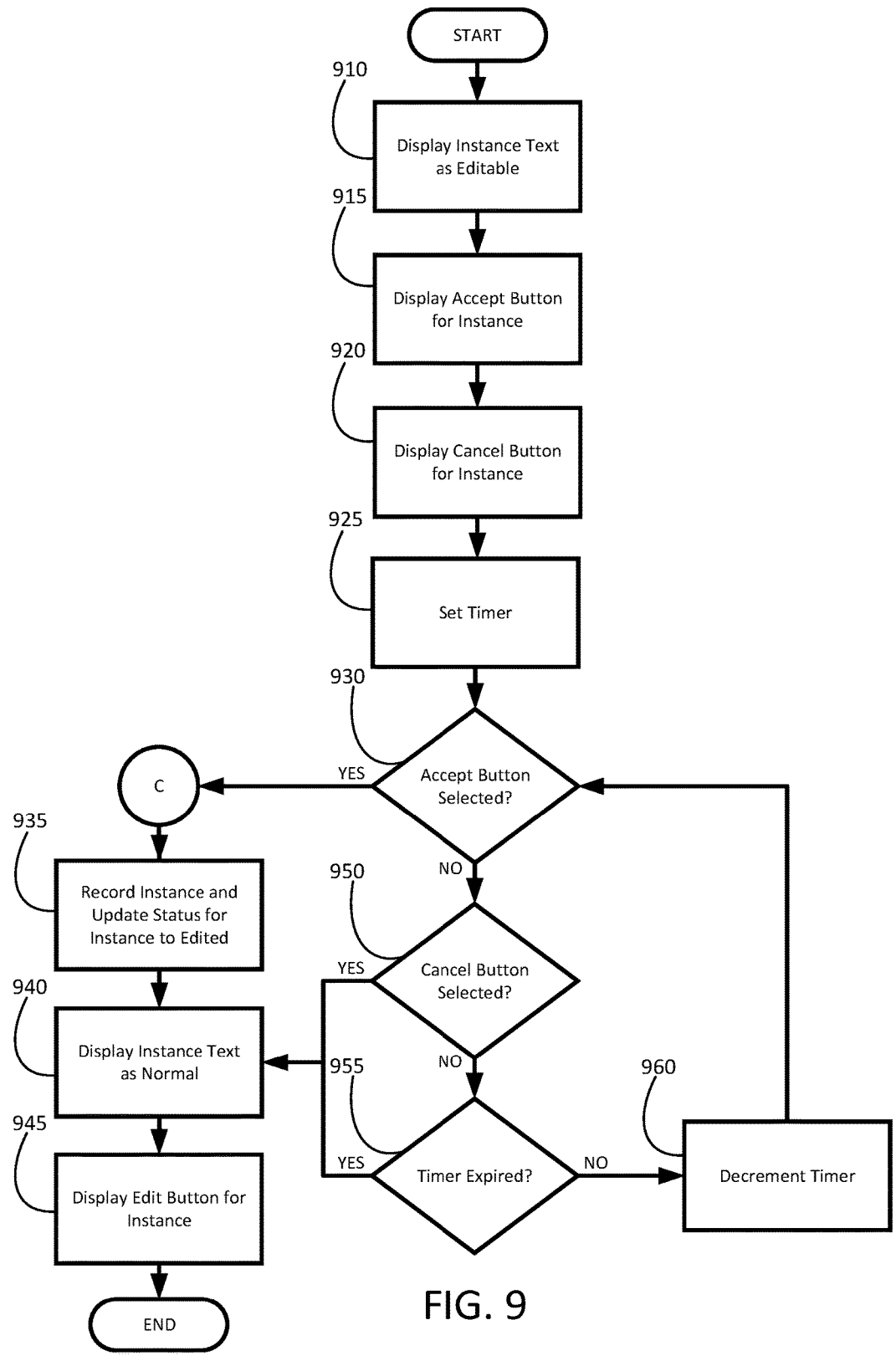
FIG. 9 illustrates a process flow in response to a verification agent selecting an instance of a communication to edit in accordance with various embodiments of the present invention.

Turning now to FIG. 9, additional details are provided regarding a process flow that is performed when the verification agent selects a particular instance to edit before having the instance delivered to the remote party according to various embodiments of the invention. In particular, FIG. 9 is a flow diagram showing an edit instance module for performing such functionality according to various embodiments of the invention. For example, the flow diagram shown in FIG. 9 may correspond to operations carried out by one or more processors in one or more components, such as, for example, the verification agent's workstation described above, as it executes the edit instance module stored in the component's volatile and/or nonvolatile memory.

The process flow begins with the edit instance module displaying the text of the instance selected by the verification agent as editable in Operation 910. Accordingly, the text of the instance is displayed on the verification agent's workstation so that the agent may edit any part of the text for the instance. In addition, the edit instance module displays an "accept" button on the workstation in Operation 915 that can be selected by the verification agent to accept the edits made to the instance. Further, the edit instance module displays a "cancel" button on the workstation in Operation 920 that can be selected by the verification agent to cancel editing the instance.

Next, the edit instance module sets a timer in Operation 925. Here, a timer is set in various embodiments so that the instance does not sit in an edit mode indefinitely. At this point, the verification agent can now edit the text of the instance as desired. However, in turn, the timer provides a safeguard so that if the verification agent selects an instance to edit but then becomes distracted and forgets to edit the instance, the instance is then automatically return to its previous status upon the timer expiring.

Figure 10:
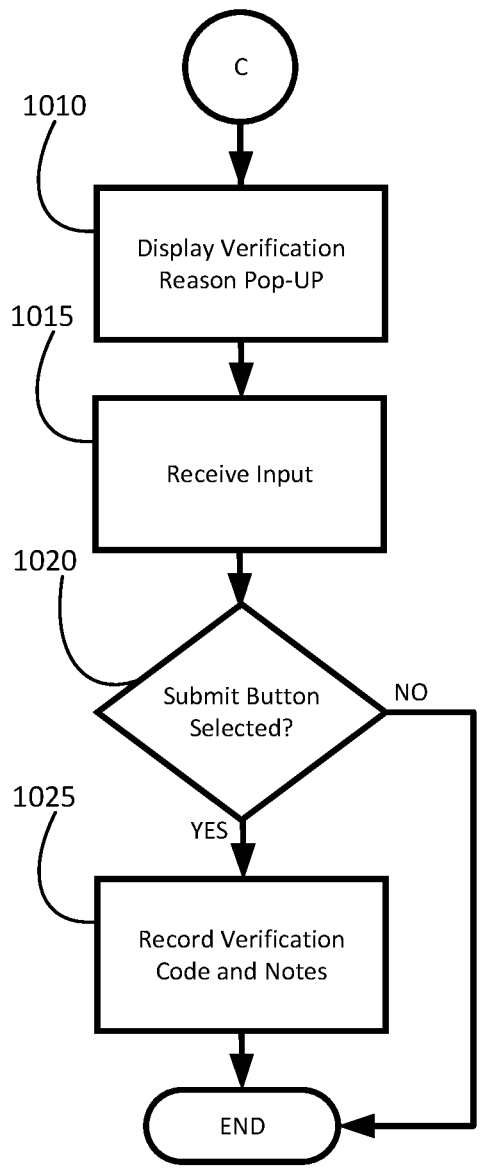
FIG. 10 illustrates a process flow displaying a verification reason pop-up screen in accordance with various embodiments of the present invention.

Continuing on, the edit instance module determines whether the verification agent has edited the instance and selected the "accept" button in Operation 930. If so, then the edit instance module displays a verification reason pop-up screen in various embodiments at C. Thus, turning briefly to FIG. 10, the edit instance module displays the verification pop-up screen in Operation 1010. This screen allows the verification agent to provide further information on the edits made to the instance and/or why the agent edited the instance. Therefore, in particular embodiments, the agent indicates such information on the screen by selecting a verification code and providing any notes if described.

The verification agent accepts or cancels the selections and in turn, the edit instance module received the input in Operation 1015. As a result, the edit instance module determines whether the verification agent has submitted information on the verification reason pop-up screen in Operation 1020 and if so, then records the verification code and notes in Operation 1025. This information can then be made available to the originating agent handling the communication for the instance so that he or she can be made aware of why the verification agent edited the instance before it was delivered to the remote party.

Returning to FIG. 9, the edit instance module now records the edited instance and updates the status of the instance to "edited" in Operation 935. Next, the edit instance module displays the edited text of the instance as normal on the verification agent's workstation in Operation 940 so that it is no longer editable. Finally, the edit instance module displays the edit button for the instance again in Operation 945. At this point, the verification agent can accept the edited instance so that it is delivered to the remote party or wait to have the timer expire, in which case, the edited instance is automatically delivered to the remote party. As a result of the editing, a notification may be sent to the originating agent informing him or her that the message was edited before being delivered to the remote party.

Returning to Operation 930, if the edit instance module determines the verification agent has not selected the "accept" button, then the module determines whether the verification agent has instead selected the "cancel" button in Operation 950. If so, then the edit instance module displays the text of the instance as normal, without retaining any editing that may have been performed on the text. Again, the edit instance module displays the "edit" button for the instance in Operation 945.

Finally, if the edit instance module determines the verification agent has not selected the "cancel" button, then the module determines whether the timer has expired for editing the instance in Operation 955. If the timer has not expired, then the edit instance module decrements the timer in Operation 960 and returns to Operation 930 to determine whether input has now been provided by the verification agent related to editing the instance. However, if the timer has expired, then the edit instance module displays the text of the instance as normal, without retaining any editing that may have been performed on the text of the instance in Operation 940.

At this point, the originating agent and remote party may continue with their exchange on the communication without the remote party ever knowing that an instance (a message) of the communication he or she received was edited. In addition, the originating agent may be able to review the verification reason and notes provided by the verification agent as to why he or she edited the instance as a teaching tool to better educate the agent on how to respond appropriately in similar situations in the future.

Reject Instance Module

Figure 11:
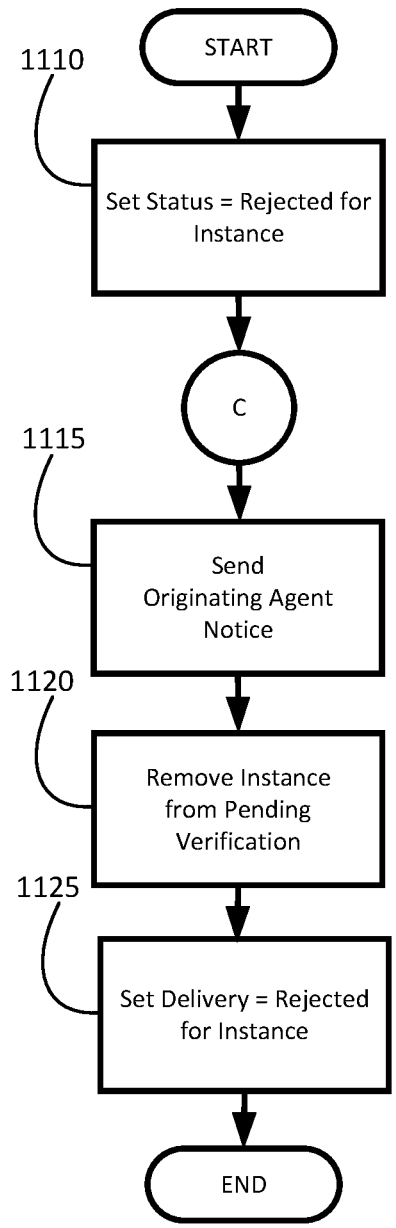
FIG. 11 illustrates a process flow in response to a verification agent selecting an instance of a communication to reject in accordance with various embodiments of the present invention.

Another action the verification agent may take with respect to an instance is completely rejecting the instance so that it is not delivered to the remote party. Turning now to FIG. 11, additional details are provided regarding a process flow that is performed when the verification agent selects a particular instance to reject according to various embodiments of the invention. In particular, FIG. 11 is a flow diagram showing a reject instance module for performing such functionality according to various embodiments of the invention. For example, the flow diagram shown in FIG. 11 may correspond to operations carried out by one or more processors in one or more components, such as, for example, the verification agent's workstation described above, as it executes the reject instance module stored in the component's volatile and/or nonvolatile memory.

The process flow begins with the reject instance module setting the status of the instance to "rejected" in Operation 1110. Accordingly, in various embodiments, the reject instance module updates a record of the instance to shown that the instance has been rejected. For example, in particular embodiments, the reject instance module updates the STATUS_ID data element 271 in the INSTANCES structure 250 to "rejected."

At this point, the reject instance module displays a verification reason pop-up screen in various embodiments at C. As previously discussed, the verification reason pop-up screen allows the verification agent to identify a reason for rejecting the instance and provide any notes to further explain the rejection of the instance. Once the verification agent has entered the information on the verification reason pop-up screen, the reject instance module sends a notice to the originating agent informing the agent the instance has been rejected in Operation 1115. As a result, the originating agent learns the instance has been rejected in near real-time by the verification agent and the reason why the instance has been rejected. Accordingly, the originating agent can makes adjustments to further instances to avoid another rejection.

The reject instance module removes the instance from the Pending Verification portion of the verification agent's workstation screen in Operation 1120. In addition, in particular embodiments, the instance may be moved to a portion of the workstation screen that displays the history of instances for the communication with the particular instance showing that it was rejected. The same may also be displayed on the originating agent's workstation screen.

Finally, the reject instance module sets the delivery of the instance to "rejected" in Operation 1125. Accordingly, in various embodiments, this operation involves the reject instance module updating the DELIVERY data element 257 in the INSTANCES structure 250 to "rejected." As a result of this process, the instance is removed from ever being delivered to the remote party involved in the communication.

Accept Instance Module

Figure 12:
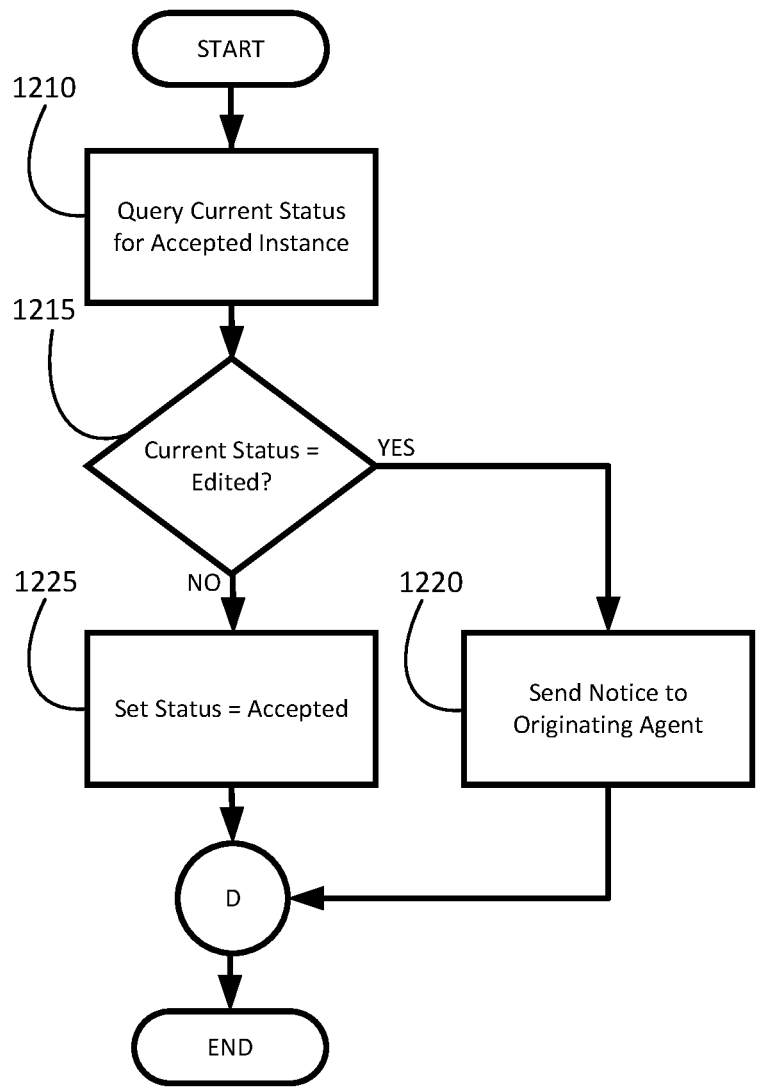
FIG. 12 illustrates a process flow in response to a verification agent selecting an instance of a communication to accept in accordance with various embodiments of the present invention.

Finally, another action the verification agent may take with respect to an instance is to accept the instance, resulting in the instance being delivered to the remote party. Turning now to FIG. 12, additional details are provided regarding a process flow that is performed when the verification agent selects a particular instance to accept according to various embodiments of the invention. In particular, FIG. 12 is a flow diagram showing an accept instance module for performing such functionality according to various embodiments of the invention. For example, the flow diagram shown in FIG. 12 may correspond to operations carried out by one or more processors in one or more components, such as, for example, the verification agent's workstation described above, as it executes the accept instance module stored in the component's volatile and/or nonvolatile memory.

The process flow begins with the accept instance module querying the current status of the instance in Operation 1210. Specifically, in particular embodiments, the accept instance module queries the status stored in the STATUS_ID data element 271 of the INSTANCES structure 250. Once the current status has been queried, the accept instance module determines whether the current status is set to "edited" in Operation 1215. A status of "edited" indicates the text of the instance was edited by the verification agent prior to the verification agent accepting the instance. If the current status is "edited," then the accept instance module sends a notice to the originating agent that the instance was edited prior to delivering it to the remote party involved in the communication in Operation 1220. However, if the current status is not "edited" (e.g., the current status is pending), then the accept instance module sets the status to "accepted" in Operation 1225.

Figure 13:
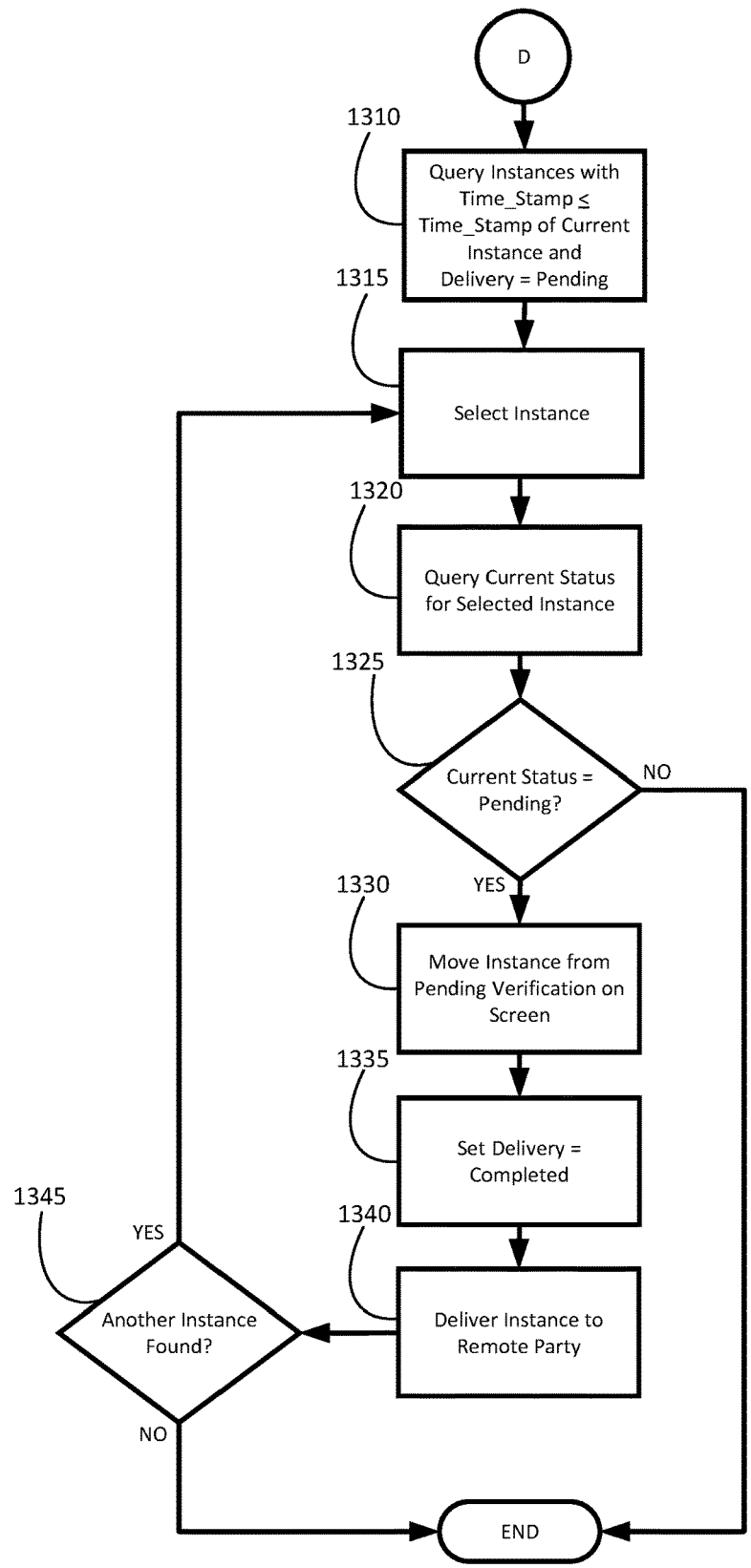
FIG. 13 illustrates a process flow for recording delivery an instance of a communication to a remote party in accordance with various embodiments of the present invention.

At this point, the process continues at D with recording delivery of the instance to the remote party. Thus, turning to FIG. 13, a process flow is provided with respect to recording delivery of the instance according to various embodiments. Here, the process begins with the accept instance module querying any instances for the communication with a time stamp less than or equal to the time stamp of the instance that has been accepted and a delivery of pending in Operation 1310.

For instance, in particular embodiments, the accept instance module queries any instances for the communication found in the INSTANCES structure 250 with a date and time in the TIME_STAMP data element 256 less than or equal to the date and time in the TIME_STAMP data element 256 of the instance that has currently been accepted by the verification agent and a delivery status stored in the DELIVERY data element 257 of the INSTANCES structure 250 equal to "pending." Here, the instances for the communication are identified via the COMMS_TO_INSTANCES data structure 240 based on having the same communication identifier in the COMM_ID data element 211 as the instance that has currently been accepted. The queried results in Operation 1310 includes the instance that has currently been accepted by the verification agent, but the results also include any instances identified for the communication that represent instances that should potentially be delivered to the remote party prior to the instance that has currently been accepted by the verification agent.

For example, the originating agent and remote party may be engaged in a Web chat session (communication) and the originating agent may have entered a first chat message that states "Hello Tom, I am happy to assist you today!" and a second chat message that states "So, what help do you need?" Here, both messages (instances) may be initially placed in a status of pending, awaiting the verification agent's review of the messages. Accordingly, the verification agent decides to edit the second message to read instead "How may I be of help?" and after editing the message, accepts the message to be delivered to the remote party.

However, in this example, the first message has not yet been accepted. Therefore, if the second message is just automatically delivered to the remote party without considering where the message sequentially sits with respect to other messages the originating agent has initiated to have delivered to the remote party, then the second message will be delivered to the remote party before the first message is delivered. In other words, the remote party may receive the message "How may I be of help?" before receiving the message "Hello Tom, I am happy to assist you today!" This can cause the remote party to become confused. Therefore, the accept instance module in various embodiments takes into consideration the sequence of instances in determining when to deliver a particular instance that has been accepted by the verification agent.

Thus, returning to FIG. 13, the accept instance module selects the first instance found in the query results in Operation 1315. Accordingly, in various embodiments, the instances in the query results are ordered according to their time stamp so that the accept instance module initially selects the instance with the oldest time stamp with respect to the current time from the query results, and then the instance with the next oldest time stamp, and so forth.

Once the accept instance module has selected the instance from the query results, the module queries the current status for the selected instance in Operation 1320. Again, in particular embodiments, the current status of the instance can be queried from the STATUS_ID data element 271 found in the INSTANCES structure 250. The accept instance module then determines whether the current status of the instance is "pending" in Operation 1325. Here, a current status of "pending" indicates that the instance is still waiting to be reviewed by the verification agent. Therefore, if the current status of the instance is "pending," Then the process ends without having the instance that has currently been accepted by the verification agent delivered to the remote party. Specifically, the process is ended because the query has found an instance that still needs to be reviewed that is chronologically before the instance that has currently been accepted by the verification agent in the sequence of instances for the communication.

However, if the current status of the instance is not "pending," then the current status must be one of "no validation required," "accepted," "edited," and "timed out." Note the current status of the instance cannot be "rejected" because when an instance has been rejected, the delivery of the rejected instance is set to "rejected" and therefore, such an instance would not have been found in the query performed by the accept instance module in Operation 1310. Therefore, if the current status of the instance is not "pending," then the accept instance module moves the instance from the Pending Verification portion of the verification agent's workstation screen in Operation 1330. In addition, in various embodiments, the accept instance module may move the instance to the portion of the verification agent's screen listing the history of instances for the communication. Furthermore, the accept instance module may have the instance move in a similar fashion on the originating agent's workstation screen.

At this point, the accept instance module sets the delivery for the instance to "completed" in Operation 1335. In addition, the accept instance module has the instance delivered to the remote party in Operation 1340.

Thus, returning to the example, had the status been set to timed out for the first message (instance) "Hello Tom, I am happy to assist you today!," the accept instance module would have initially processed this message because this first message would have been the instance with the oldest time stamp and a delivery set to "pending" found in the query. Accordingly, the accept instance module would move the instance from the Pending Verification portion of the verification agent's screen, set the delivery for the first message to "completed," and have the first message delivered to the remote party. As a result, the remote party receives a chat message from the originating agent that reads "Hello Tom, I am happy to assist you today!"

The accept instance module then determines whether any other instances were found in the query results in Operation 1345. Here, in the example, the query would include the second message that was edited and then accepted by the verification agent. Therefore, the accept instance module would move this instance from the Pending Verification portion of the verification agent's screen, set the delivery for the second message to "completed," and have the second message delivered to the remote party. Accordingly the remote party would then receive a chat message from the originating agent that reads "How may I be of help?"

Again, since this message was edited by the verification agent before it was delivered to the remote party, the remote party is unaware that the edit occurred. Furthermore, the originating agent may be made aware of the edit made by the verification agent in near real-time so that the originating agent may see how the message was edited and learn to better fashion the message for similar situations in future communications.

Instance Timed Out Module

Figure 14:
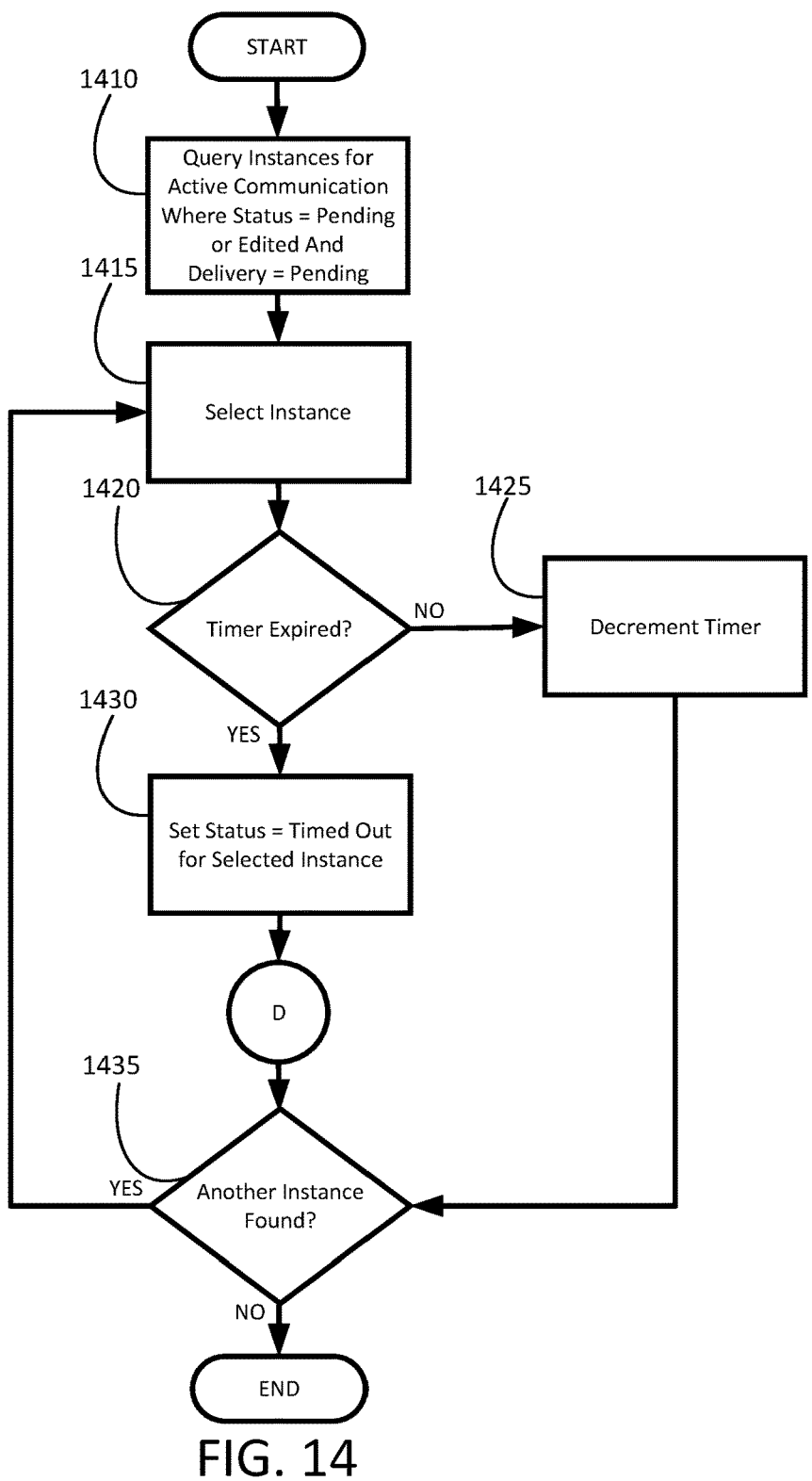
FIG. 14 illustrates a process flow checking to determine whether a timer for an instance of a communication has expired in accordance with various embodiments of the present invention.

As previously mentioned, an instance that is pending review by the verification agent can time out if the instance remains pending for too long. Such action is taken in various embodiments to ensure that the remote party does not wait too long during a communication to receive a response from the agent handling the communication. Thus, turning now to FIG. 14, additional details are provided regarding a process flow that is performed when a particular instance times out according to various embodiments of the invention. In particular, FIG. 14 is a flow diagram showing an instance timed out module for performing such functionality according to various embodiments of the invention. For example, the flow diagram shown in FIG. 14 may correspond to operations carried out by one or more processors in one or more components, such as, for example, the verification agent's workstation described above, as it executes the instance timed out module stored in the component's volatile and/or nonvolatile memory.

Here, the instance timed out module monitors the instances of communications being handled by a particular verification agent. Thus, in particular embodiments, the instance timed out module is invoked periodically (e.g., every two seconds) and the process flow begins with the instance timed out module querying the instances for any active communications being handle by the verification agent with a statue of "pending" or "edited" and a delivery of "pending" in Operation 1410.

Specifically, in particular embodiments, the instance timed out module queries the STATUS_ID data element 271 and the DELIVERY data element 257 found in the INSTANCE structure 250 to identify instances for communications currently being handled by the verification agent with a status of "pending" or "edited" and a delivery of "pending." The instances for the communications can be identified via the COMMS_TO_INSTANCES structure 240 and the COMMUNICATIONS structure 210 where the VERIFICATION_AGENT_ID data element 232 identifies the verification agent is handling the communications.

Once the instances have been queried, the instance timed out module selects an instance from the query results in Operation 1415. Note that in particular embodiments, the instance timed out module may first determine whether any instances were located in the query. At this point, the instance timed out module determines whether the timer has expired for the instance in Operation 1420. Therefore, in particular embodiments, the instance timed out module determines whether the TIMER_VALUE data element 254 for the instance found in the INSTANCES structure 250 has reached zero. If the instance timed out module determines the timer has not expired, then the module decrements the timer in Operation 1425.

However, if the timer has expired, then the instance timed out module in particular embodiments sets the status of the instance to "timed out" in Operation 1430. Accordingly, the instance timed out module moves to D and performs the operations described in FIG. 13 to determine whether to deliver the instance to the remote party. At this point, the instance timed out module determines whether another instance has been located in the query results in Operation 1435. If so, then the instance time out returns to Operation 1415 and selects the next instance and performs the same operations for the next instance.

Agent GUIs

Figure 15:
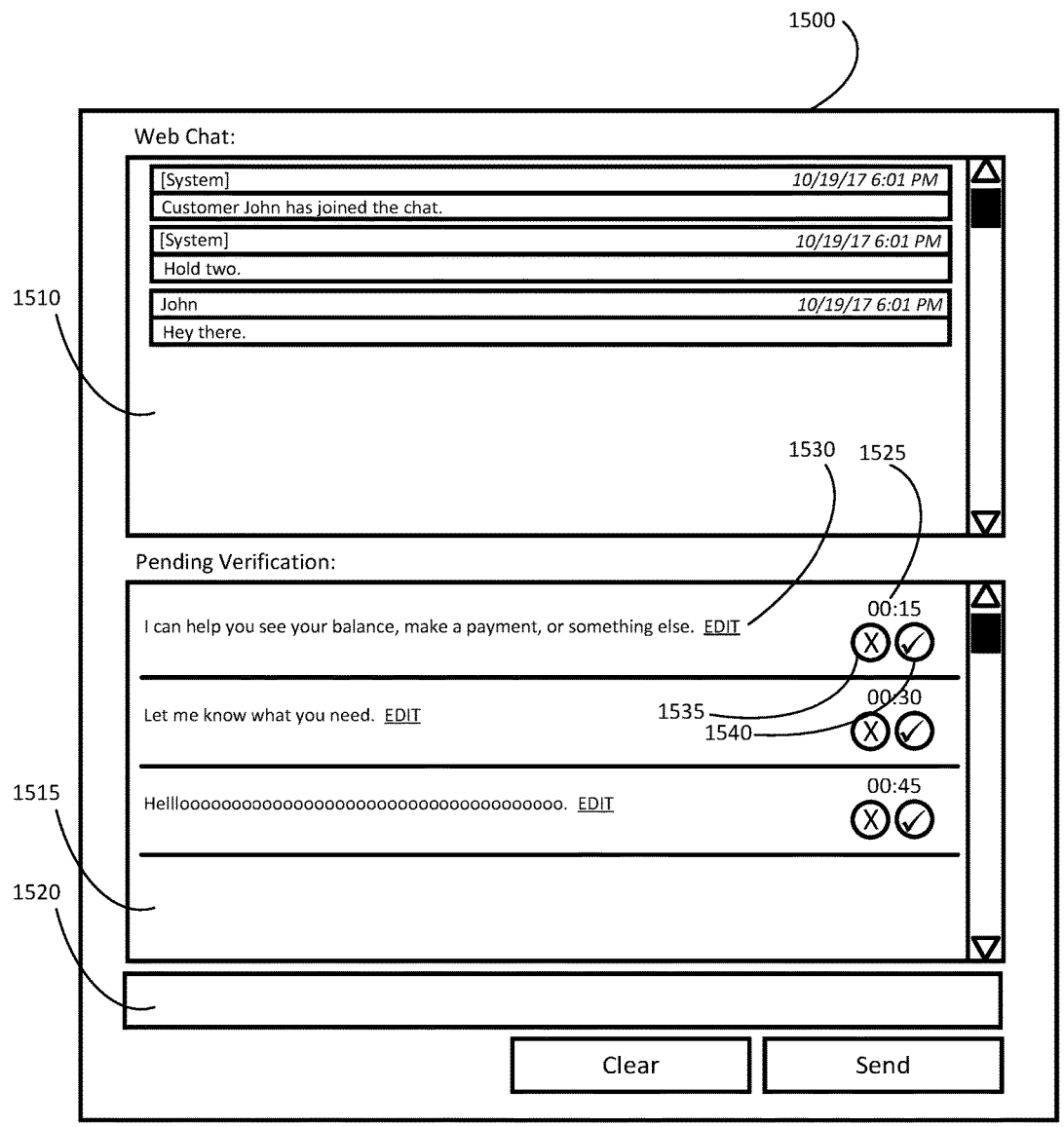
FIG. 15 illustrates a graphical user interface ("GUI") used in various embodiments by a verification agent.

FIG. 15 illustrates a graphical user interface ("GUI") 1500 that may be used in various embodiments by a verification agent. Here, the particular communication involves a Web chat session being conducted between an originating agent named Joyce and a remote party named John. The top section (Web Chat section) 1510 of the GUI 1500 provides a history of the chat messages exchanged between the originating agent and the remote party. While the middle section (Pending Verification section) 1515 of the GUI 1500 provides a listing of chat messages initiated by the originating agent that are waiting for review and verification by the verification agent. Finally, the bottom section 1520 of the GUI 1500 provides an area that the verification agent can enter messages to send for the chat session if desired.

Here, each chat message (each instance) awaiting verification is associated with a timer 1525 indicating the amount of time left for the verification agent to review the message. In addition, an EDIT button 1530 is provided that allows the verification agent to select a particular chat message to edit. Furthermore, a reject button 1535 is provided so that the verification agent can reject a particular chat message and an accept button 1540 is provided so that the verification agent can accept a particular chat message.

Figure 16:
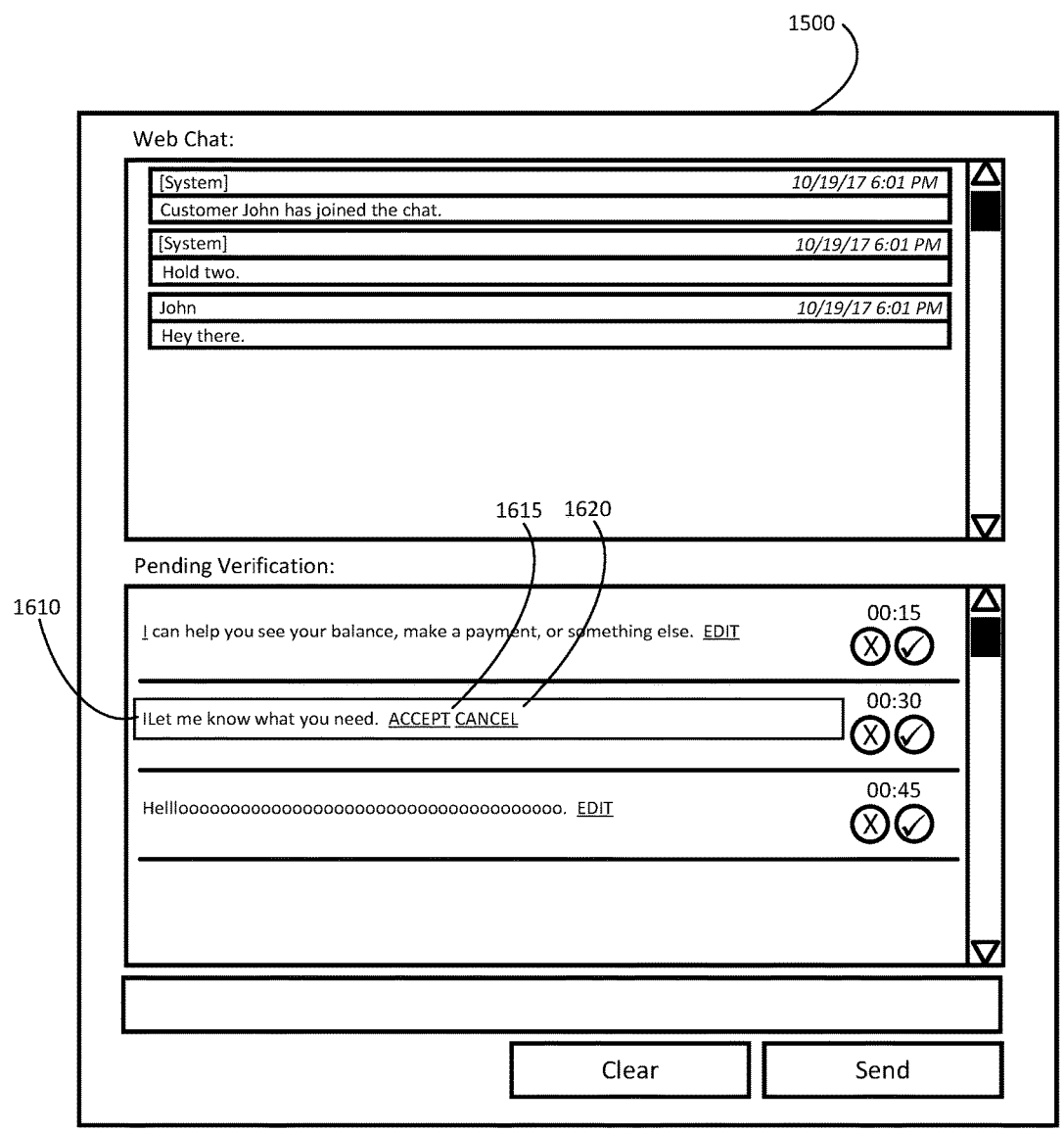
FIG. 16 illustrates a GUI used in various embodiments by a verification agent in editing an instance of a communication.

Turning now to FIG. 16, this figure illustrates the verification agent's GUI 1500 when the verification agent has selected a particular chat message (particular instance) that is pending to edit. Here, the chat message selected to be edited 1610 is shown with a box around the message 1610 and a cursor at the beginning of the message 1610. Accordingly, the verification agent can edit the message 1610 by using an input device such as a keyboard. Once the verification agent has completed editing the message, he or she can select the ACCEPT button 1615 to accept the edits to the message 1610. In addition, the verification agent may select the CANCEL button 1620 to cancel the edits made to the message 1610 and return the message 1610 to its original form if desired.

Figure 17:
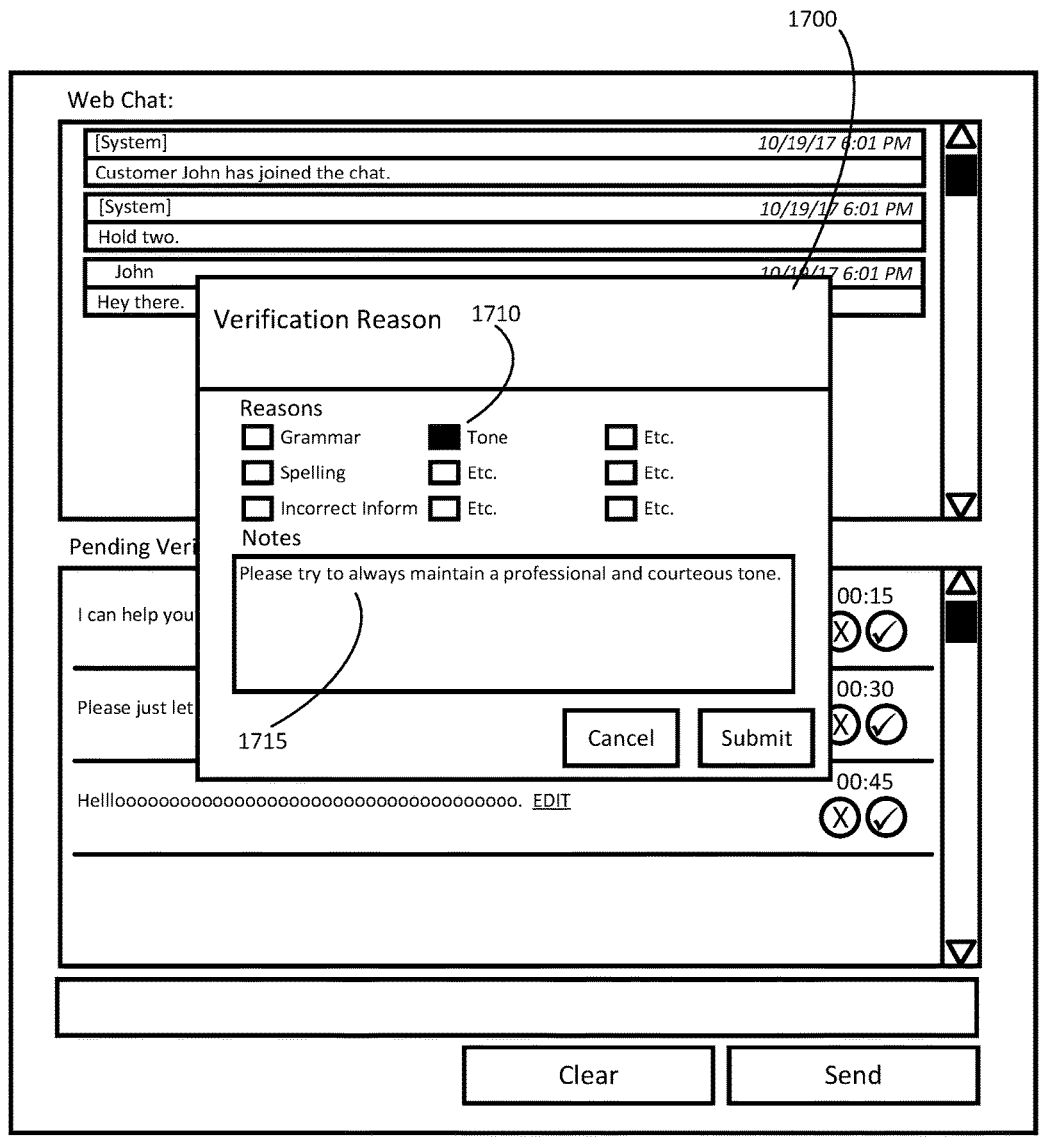
FIG. 17 illustrates a GUI used for providing a verification reason in various embodiments.

FIG. 17 illustrates a verification reason pop-up GUI 1700 that is provided in particular embodiments when the verification agent has edited or rejected a pending instance for a communication. Here, the GUI 1700 provides the agent with a list of reasons the agent may select from to indicate a reason for the edit or rejection of the instance. For example, the verification agent may indicate the tone of the instance was not acceptable by selecting the Tone indicator 1710 on the GUI 1700. In addition, the verification agent may provide a note in the Notes section 1715 of the screen 1700 to provide further detail on the action taken by the verification agent as well as instructs for the originating agent.

Figure 18:
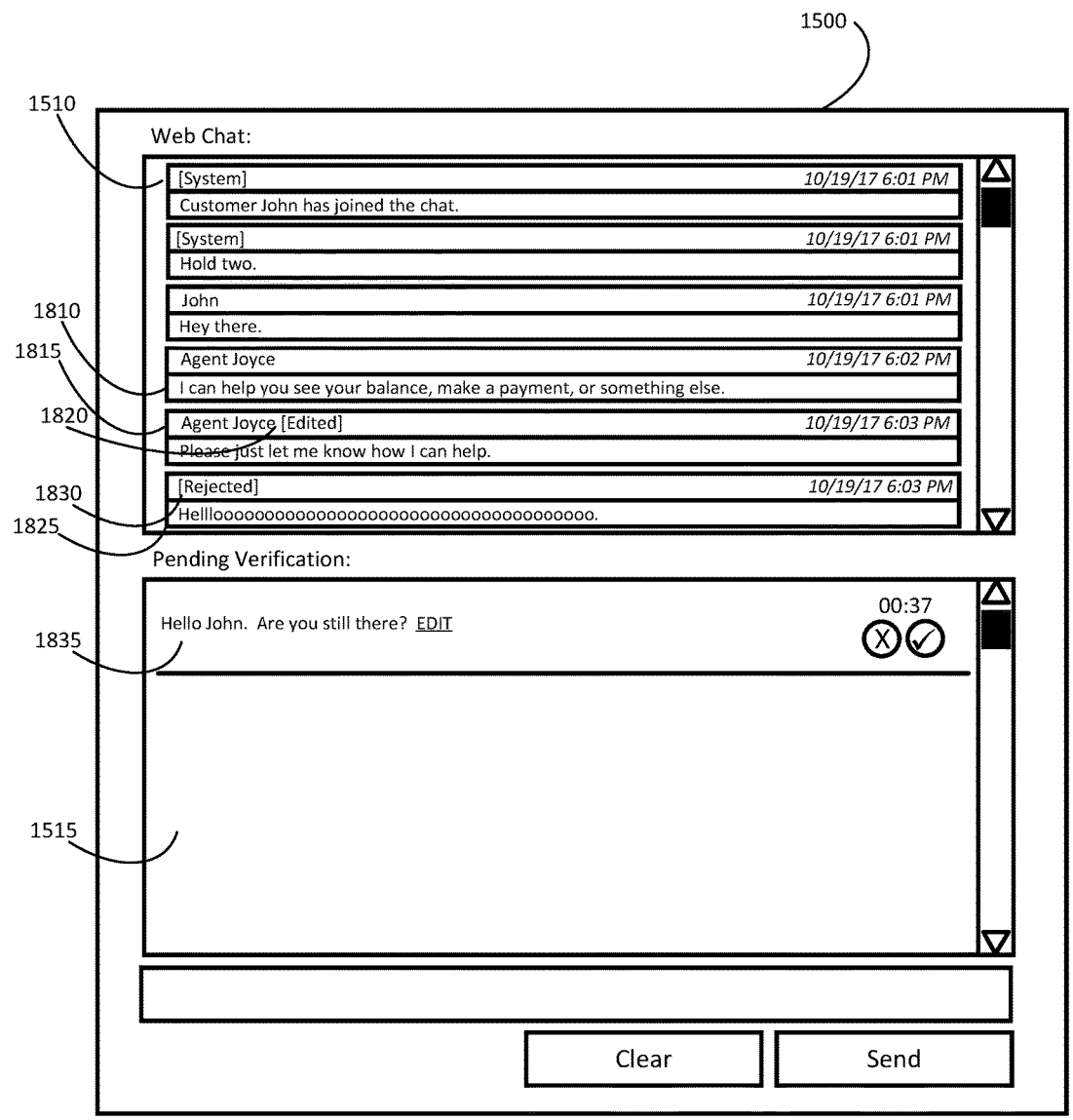
FIG. 18 illustrates a GUI used in various embodiments by a verification agent in displaying verification results.

Accordingly, as the verification agent reviews and verifies instances (chat messages) for the communication, such instances are moved in various embodiments from the middle section 1515 of the GUI 1500 showing instances pending review to the top section of the GUI 1500 showing the history of instances for the communication. Such migration of instances is shown in FIG. 18. Here, the top section 1510 of the GUI 1500 shows that a chat message 1810 originated by Agent Joyce has been delivered to the remote party John. This particular message 1810 appears to have been approved by the verification agent without editing.

However, the next message 1815 sent by Agent Joyce indicates the message 1815 has been edited by the verification agent based on the message 1815 including a marker 1820 indicating such. In particular embodiments, the text 1825 of the message may also display the edits made to the message. Further, the top section 1510 also shows another message 1825 originated by Agent Joyce was rejected by the verification agent because the message 1825 includes a rejected marker 1830. Finally, the middle section 1515 of the GUI 1500 has a message 1835 originated by Agent Joyce waiting to be reviewed and verified by the verification agent.

Figure 19:
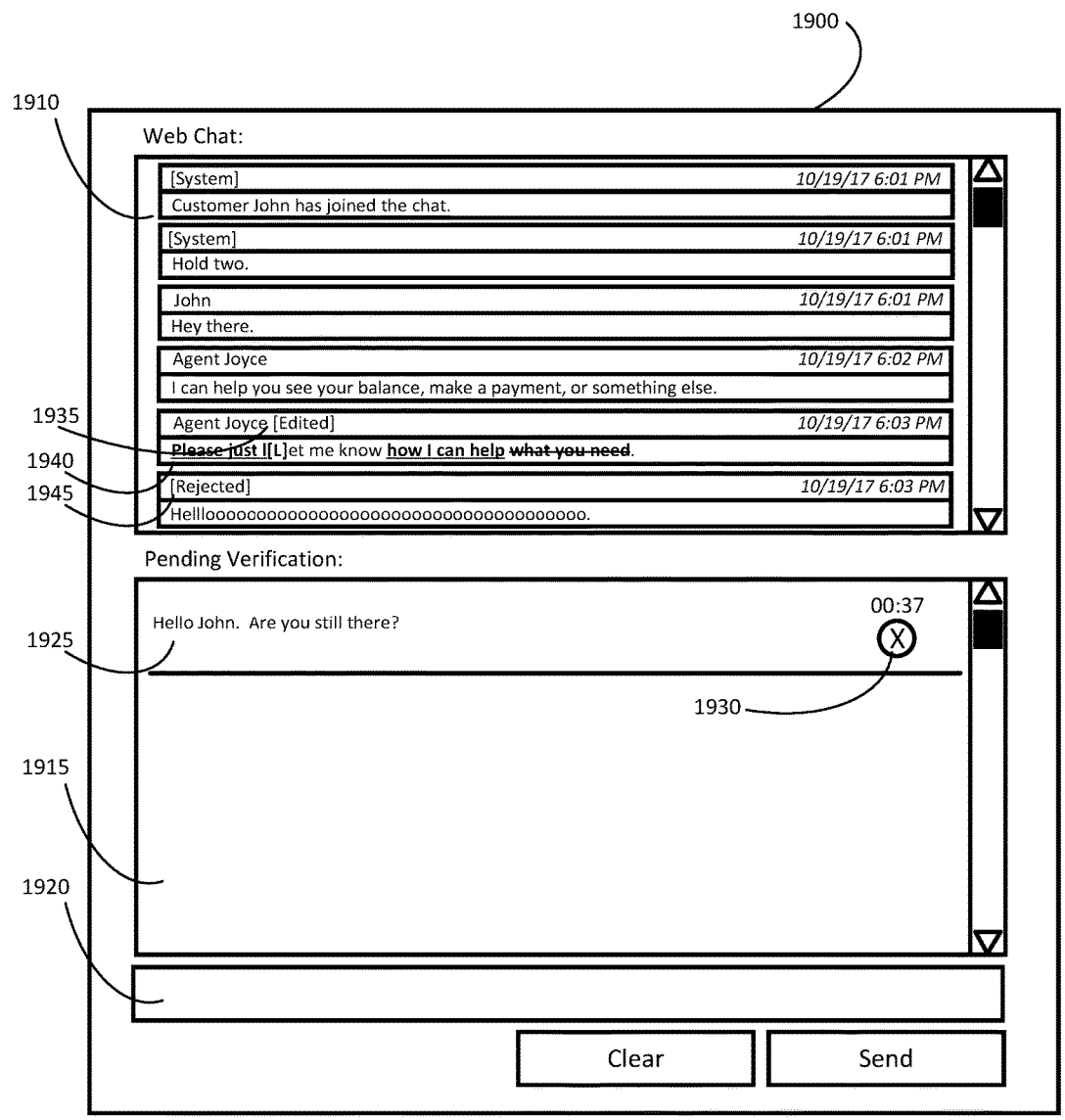
FIG. 19 illustrates a GUI used in various embodiments by an originating agent.

Finally, FIG. 19 illustrates a graphical user interface ("GUI") 1900 that may be used in various embodiments by an originating agent. Here, the GUI 1900 is set up in a similar fashion to the GUI shown in FIGS. 15-18 for the verification agent. The GUI 1900 includes a top section 1910 to provide the history of instances exchanged during the communication, a middle section 1915 that displays instances that are pending verification and/or delivery, and a bottom section 1920 that provides an area for the originating agent to enter an instance.

The originating agent has one instance 1925 pending verification. The agent is provided with a cancel button 1930 that allows the agent to cancel the instance before the instance is verified or has timed out to remove the instance from being delivered to the remote party. In addition, the top section 1910 of the GUI 1900 shows one of the instances (chat messages) 1935 entered by the originating agent (Agent Joyce) was edited before being delivered to the remote party. In this particular embodiment, the edits 1940 made to the text of the instance are shown for the instance with additions shown in underline and bold and deletions shown in strikethrough and bold. Showing the edits allows Agent Joyce to see how the instance was edited so that she may learn what to provide in an instance the next time a similar situation arises. Further, in particular embodiment, the originating agent may click on the edited instance to bring up information on the editing of the instance such as a reason code and any notes provided by the verification agent. Such information may further help the originating agent to understand why the instance was edited. Finally, the originating agent (Agent Joyce) can see that another one of the instances (chat messages) 1945 she entered was rejected by the verification agent. Again, in particular embodiments, Agent Joyce may click on the rejected instance to bring up information on why the instance was rejected.

Accordingly, the embodiments of the agents' GUIs 1500, 1900 shown in FIGS. 15-19 demonstrate how the instances for a communication can be organized so that the verification and/or originating agents can easily identify the instances that are in need of verification and the history of instances for the communication. Specifically, the top section (communication history section) 1510, 1910 of the GUIs 1500, 1900 can be used to provide information on: (1) instances initiated by the originating agent that were accepted, edited, or rejected; (2) instances that were initiated by the remote party; and (3) instances (e.g., system instances) that were neither initiated by the originating agent nor the remote party, but convey information about the communication. On many occasions, these different instances are arranged in the top section 1510, 1910 of the GUIs 1500, 1900 to provide a chronological history of the instances involved in the communication. In addition, the different types of instances may be distinguished from one another in the top section 1510, 1910 of the GUIs 1500, 1900 by showing them, for example, in different colors and/or fonts.

Furthermore, the middle section (or pending verification section) 1515, 1915 of the GUIs 1500, 1900 can provide the verification and originating agents with the instances initiated by the originating agent that have yet to be delivered to the remote party involved in the communication. In particular embodiments, this particular section 1515, 1915 not only lists instances pending verification but also lists instances that do not require verification but are still pending delivery to the remote party. For example, such an instance may exist because an instance requiring verification may be chronologically positioned before the instance still pending delivery. Therefore, the embodiments of the verification and originating agents' GUIs 1500, 1900 shown in FIGS. 15-19 allow the verification and originating agents to keep track of the history of instances involved in a communication, while also keeping track of the instances initiated by the originating agent for the communication that are pending verification and/or delivery.

Exemplary Processing Device Architecture

Figure 20:
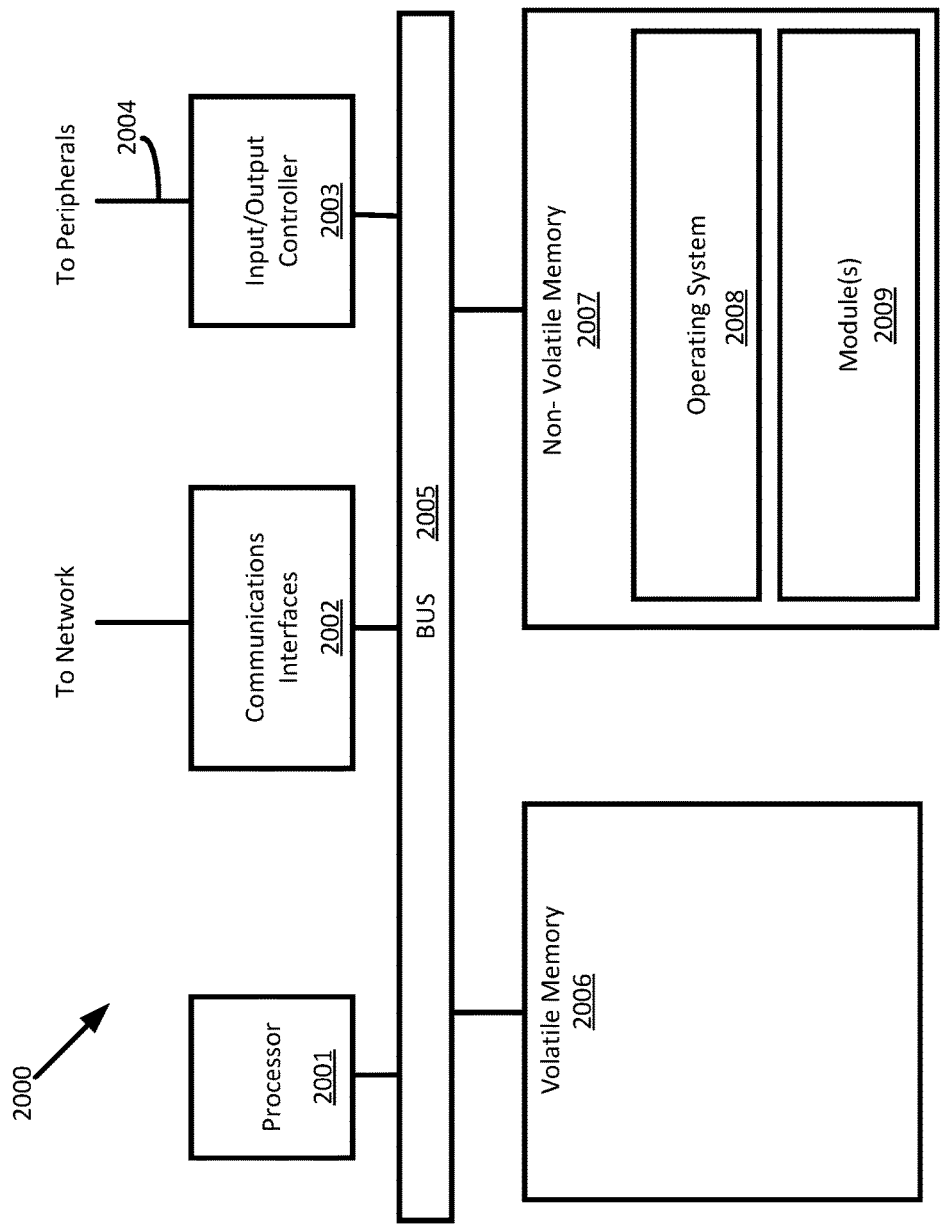
FIG. 20 is an exemplary schematic diagram of a processing component used in various embodiments of the contact center architecture to practice the technologies disclosed herein.

As discussed in conjunction with FIG. 20, the contact center architecture 2000 may comprise various components. Accordingly, FIG. 20 is an exemplary schematic diagram of a processing component 2000 that may be used in various embodiments of the contact center architecture 2000 to practice the technologies disclosed herein such as, for example, the communications handler 150, the email server 135, the text gateway server 140, the web server 145, and/or an agent's computing device 160a-160c. In general, the term "processing component" may be exemplified by, for example, but without limitation: a various types of computers, servers, blades, gateways, switches, and the like, as well as any combination of devices or entities adapted to perform the functions described herein.

As shown in FIG. 20, the processing component 2000 may include one or more processors 2001 that may communicate with other elements within the processing component 2000 via a bus 2005. The processor 2001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 2000 may also include one or more communication interfaces 2002 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 2000 may further include an input/output controller 2003 that may communicate with one or more input devices or peripherals using an interface 2004, such as, but not limited to: a keyboard, a mouse, a touch screen/display input, microphone, pointing device, etc. The input/output controller 2003 may also communicate with output devices or peripherals, such as displays, printers, speakers, headsets, banner displays, etc.

The processor 2001 may be configured to execute instructions stored in volatile memory 2006, non-volatile memory 2007, or other forms of computer-readable storage media accessible to the processor 2001. The volatile memory 2006 may comprise various types of memory technologies, including, but not limited to: random access memory ("RAM"), dynamic random access memory ("DRAM"), static random access memory ("SRAM"), and other forms well known to those skilled in the art. The non-volatile memory 2007 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2007 may store program code and data, which also may be loaded into the volatile memory 2006 at execution time. Specifically, the non-volatile memory 2007 may store one or more program modules 2009, such as the handle communication module, the handle instance module, the display instance module, the edit instance module, reject instance module, accept instance module, and/or the instance timed out module described above containing instructions for performing the processes and/or functions associated with the technologies disclosed herein, and/or operating system code 2008. In addition, these program modules 2009 may also access, generate, or store data 2010, in the non-volatile memory 2007, as well as in the volatile memory 2006. The volatile memory 2006 and/or non-volatile memory 2007 may be used to store other information including, but not limited to: records, applications, programs, scripts, source code, object code, byte code, compiled code, interpreted code, machine code, executable instructions, or the like. These may be executed or processed by, for example, the processor 2001 and/or may form a part of, or may interact with, the program modules 2009.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for reviewing one or more instances initiated by an originating agent during a text-based communication being conducted between the originating agent and a remote party, the method comprising:
    determining by a communications handler that an instance of the one or more instances has been initiated by the originating agent; and
    upon determining the instance has been initiated by the originating agent:
        locating a verification agent by the communications handler based on one or more skills of the verification agent who is to review the instance;
        displaying text of the instance on a workstation being used by the verification agent prior to the instance being delivered to the remote party; and
        upon the verification agent editing the text of the instance, delivering the instance to the remote party displaying the edited text.

2. The method of claim 1 further comprising determining by the communications handler that the one or more instances require verification based on at least one of (1) one or more skills of the originating agent and (2) a flag set for the text-based communication.

3. The method of claim 2 further comprising:
   setting a timer for the text-based communication upon determining the one or more instances initiated by the originating agent require verification; and
   delivering the one or more instances to the remote party in response to not locating the verification agent before the timer expires.

4. The method of claim 1 further comprising displaying the edited text of the instance to the originating agent.

5. The method of claim 4, wherein the verification agent provides a verification reason at a time the verification agent edits the text of the instance, the verification reason identifying a reason why the verification agent edited the text of the instance, and the method further comprises displaying the verification reason along with the edited text of the instance to the originating agent.

6. The method of claim 1 further comprising, upon the verification agent rejecting the text of a second instance of the one or more instances initiated by the originating agent, preventing delivery of the second instance to the remote party.

7. The method of claim 1 further comprising:
   setting a timer for each of the one or more instances initiated by the originating agent; and
   automatically delivering a third instance from the one or more instances to the remote party in response to the verification agent not editing or rejecting the third instance before the timer expires.

8. A non-transitory, computer-readable medium comprising computer-executable instructions for reviewing one or more instances initiated by an originating agent during a text-based communication being conducted between the originating agent and a remote party, that when executed, cause at least one computer processor to:
   determine an instance of the one or more instances has been initiated by the originating agent; and
   upon determining the instance has been initiated by the originating agent:
      locate a verification agent based on one or more skills of the verification agent who is to review the one or more instances;
      have text of the instance displayed on a workstation being used by the verification agent prior to the instance being delivered to the remote party; and
      upon the verification agent editing the text of the instance, have the instance delivered to the remote party displaying the edited text.

9. The non-transitory, computer-readable medium of claim 8, wherein the computer-executable instructions further cause the at least one computer processor to determine that the one or more instances require verification based on at least one of (1) one or more skills of the originating agent and (2) a flag set for the text-based communication.

10. The non-transitory, computer-readable medium of claim 9, wherein the computer-executable instructions further cause the at least one computer processor to:
    set a timer for the text-based communication upon determining the one or more instances initiated by the originating agent require verification; and
    have the one or more instances delivered to the remote party in response to not locating the verification agent before the timer expires.

11. The non-transitory, computer-readable medium of claim 8, wherein the computer-executable instructions further cause the at least one computer processor to have the edited text of the instance displayed to the originating agent.

12. The non-transitory, computer-readable medium of claim 11, wherein the verification agent provides a verification reason at a time the verification agent edits the text of the instance, the verification reason identifying a reason why the verification agent edited the text of the instance, and the computer-executable instructions further cause the at least one computer processor to have the verification reason displayed along with the edited text of the instance to the originating agent.

13. The non-transitory, computer-readable medium of claim 8, wherein upon the verification agent rejecting the text of a second instance of the one or more instances initiated by the originating agent, the computer-executable instructions further cause the at least one computer processor to prevent delivery of the second instance to the remote party.

14. The non-transitory, computer-readable medium of claim 8, wherein the computer-executable instructions further cause the at least one computer processor to:
    set a timer for each of the one or more instances initiated by the originating agent; and
    automatically have a third instance from the one or more instances delivered to the remote party in response to the verification agent not editing or rejecting the third instance before the timer expires.

15. A system for reviewing one or more instances initiated by an originating agent during a text-based communication being conducted between the originating agent and a remote party, that when executed, the system comprising;
    at least one computer processor configured to:
       determine an instance of the one or more instances has been initiated by the originating agent; and
       upon determining the instance has been initiated by the originating agent:
          locate a verification agent based on one or more skills of the verification agent;
          have text displayed of the instance on a workstation being used by the verification agent prior to the instance being delivered to the remote party; and
          upon the verification agent editing the text of the instance, have the instance delivered to the remote party displaying the edited text.

16. The system of claim 15, wherein the at least one computer processor is further configured to determine that the one or more instances require verification based on at least one of (1) one or more skills of the originating agent and (2) a flag set for the text-based communication.

17. The system of claim 16, wherein the at least one computer processor is configured to:
    set a timer for the text-based communication upon determining the one or more instances initiated by the originating agent require verification; and
    have the one or more instances delivered to the remote party in response to not locating the verification agent before the timer expires.

18. The system of claim 15, wherein the at least one computer processor is further configured to have the edited text of the instance displayed to the originating agent.

19. The system of claim 18, wherein the verification agent provides a verification reason at a time the verification agent edits the text of the instance, the verification reason identifying a reason why the verification agent edited the text of the instance, and the at least one computer processor is configured to have the verification reason displayed along with the edited text of the instance to the originating agent.

20. The system of claim 15, wherein upon the verification agent rejecting the text of a second instance of the one or more instances initiated by the originating agent, the at least one computer processor is configured to prevent delivery of the second instance to the remote party.

21. The system of claim 15, wherein the at least one computer processor is configured to:
 set a timer for each of the one or more instances initiated by the originating agent; and
 automatically have a third instance from the one or more instances delivered to the remote party in response to the verification agent not editing or rejecting the third instance before the timer expires.

\* \* \* \* \*